United States Patent
Hains et al.

(10) Patent No.: US 9,796,882 B2
(45) Date of Patent: Oct. 24, 2017

(54) CMP PROCESSING COMPOSITION COMPRISING ALKYLAMINE AND CYCLODEXTRIN

(71) Applicant: Cabot Microelectronics Corporation, Aurora, IL (US)

(72) Inventors: Alexander W. Hains, Aurora, IL (US); Tina Li, Warrenville, IL (US)

(73) Assignee: Cabot Microelectronics Corporation, Aurora, IL (US)

( * ) Notice: Subject to any disclaimer, the term of this patent is extended or adjusted under 35 U.S.C. 154(b) by 0 days.

(21) Appl. No.: 15/394,090

(22) Filed: Dec. 29, 2016

(65) Prior Publication Data
US 2017/0183540 A1    Jun. 29, 2017

Related U.S. Application Data

(60) Provisional application No. 62/272,572, filed on Dec. 29, 2015.

(51) Int. Cl.
| | |
|---|---|
| B44C 1/22 | (2006.01) |
| C03C 15/00 | (2006.01) |
| C03C 25/68 | (2006.01) |
| C23F 1/00 | (2006.01) |
| C09G 1/02 | (2006.01) |

(52) U.S. Cl.
CPC .................................. *C09G 1/02* (2013.01)

(58) Field of Classification Search
USPC ........................................................ 216/89
See application file for complete search history.

(56) References Cited

U.S. PATENT DOCUMENTS

| | | | |
|---|---|---|---|
| 6,641,630 B1 * | 11/2003 | Sun | .................... C09G 1/02 106/3 |
| 2009/0311864 A1 | 12/2009 | Yamada et al. | |
| 2012/0270400 A1 | 10/2012 | Takegoshi et al. | |
| 2017/0121560 A1 | 5/2017 | Dockery et al. | |

FOREIGN PATENT DOCUMENTS

WO    2004026983 A1    4/2004

OTHER PUBLICATIONS

Korean Intellectual Property Office, International Search Report issued in connection with Patent Application No. PCT/US2016/069237 dated Apr. 17, 2017.

* cited by examiner

*Primary Examiner* — Roberts Culbert
(74) *Attorney, Agent, or Firm* — Thomas Omholt; Erika S. Wilson; Daniel C. Schulte

(57) ABSTRACT

Described are compositions useful in methods for chemical-mechanical processing a surface of a substrate, especially a substrate that contains dielectric material, wherein the composition contains cyclodextrin and an alkylamine.

17 Claims, 2 Drawing Sheets

CMP PROCESSING COMPOSITION COMPRISING ALKYLAMINE AND CYCLODEXTRIN

FIELD OF THE INVENTION

The invention relates to compositions useful in methods for chemical-mechanical processing a surface of a substrate, especially a substrate that contains dielectric material, wherein the composition contains cyclodextrin and alkylamine.

BACKGROUND

In processes of fabricating microelectronic devices, multiple layers of conducting, semiconducting, and dielectric materials are deposited onto a surface of a substrate in a stepwise fashion. Portions of the layers may be removed, followed by further processing by selectively adding and removing materials, all with great precision. As layers are deposited onto or removed (e.g., by etching) from the substrate, the uppermost surface of the substrate may become non-planar. Before adding more material, the non-planar surface is sometimes processed by "planarization" to produce a smooth surface for a subsequent layer and processing.

Planarizing or polishing a non-planar surface is a process where material of a non-planar surface is removed to leave a highly planar surface. Planarization is useful to remove undesired surface topography such as a rough (un-even) surface, or defects such as agglomerated materials, crystal lattice damage, scratches, or contaminated layers or materials. In certain uses, planarization removes excess material that has been deposited over a substrate surface to fill features such as channels or holes of a lower layer or layers.

Chemical-mechanical planarization, or chemical-mechanical polishing (CMP), is an established commercial technique for planarizing substrates in microdevice fabrication. CMP uses a liquid chemical composition known as a "CMP composition," alternately a "CMP slurry," or just "slurry," in combination with a CMP pad, to mechanically and chemically remove material from a substrate surface. A slurry can be applied to a substrate by contacting the surface of the substrate with a CMP polishing pad to which the slurry has been applied. Material is typically removed from the substrate surface by a combination of mechanical activity of abrasive material contained in the slurry, and chemical activity of chemical materials of the slurry.

To continue reducing sizes of microelectronic devices, components that make up devices must be smaller and must be positioned ever more closely together. Electrical isolation between circuits is important for ensuring peak semiconductor performance, but becomes increasingly difficult with smaller devices. To that end, various fabrication methods involve etching shallow trenches into a semiconductor substrate and then filling the trenches with insulating (dielectric) material, thereby isolating nearby active regions of an integrated circuit. One example of such a process is referred to as shallow trench isolation (STI). This is a process in which a semiconductor layer is formed on a substrate, shallow trenches are formed in the semiconductor layer via etching or photolithography, and dielectric material is deposited over the etched surface to fill the trenches.

To ensure complete filling of the trenches, an excess amount of the dielectric material is deposited over the etched surface. The deposited dielectric material (e.g., a silicon oxide) conforms to the topography of the underlying semiconductor substrate, including at the trenches. Thus, after the dielectric material has been placed, the surface of the deposited dielectric material is characterized by an uneven combination of raised areas of the dielectric material separated by trenches in the dielectric material, the raised areas and trenches corresponding to raised areas and trenches of the underlying surface. The region of the substrate surface that includes the raised dielectric material and trenches is referred to as a "pattern" field of the substrate or the "active" field, e.g., as "pattern material," "pattern oxide," "pattern dielectric," "active oxide," etc. This region is characterized by a "step height," which is the difference in height of the raised areas of the dielectric material relative to the trench height. Excess dielectric material that makes up the raised areas is removed by a CMP process to produce a planar surface.

Chemical mechanical processing for removing pattern dielectric materials can be characterized by performance parameters that include various removal rates, "trench loss," and "planarization efficiency."

A removal rate is a rate of removal of material from a surface of a substrate, usually expressed in terms of units of length (thickness) per unit of time (e.g., Angstroms (Å) per minute). Different removal rates relating to different regions of a substrate or to different stages of a removal step can be important in assessing process performance. A "pattern removal rate" (alternately "active" removal rate) is the rate of removal of material from a desired ("active" or "target") area of a substrate, such as removal of dielectric material from raised areas of pattern dielectric at a stage of a process during which a substrate exhibits a substantial step height. "Blanket removal rate" refers to a rate of removal of dielectric material from a planarized (i.e., "blanket") dielectric material at an end of a polishing step, when step height has been significantly (e.g., essentially entirely) reduced.

In addition to a high active removal rate, another performance factor that is important in processing a dielectric substrate is planarization efficiency (PE), which is related to "trench loss." During removal of raised area dielectric material, an amount of material of trenches will also be removed. This removal of material from trenches is referred to as "trench loss." In a useful CMP process, the rate of removal of material from trenches is well below the rate of removal from raised areas. Thus, as material of the raised areas is removed (at a faster rate compared to material being removed from the trenches) the pattern dielectric becomes a planarized surface that may be referred to as a "blanket" region of the processed substrate surface, e.g., "blanket dielectric" or "blanket oxide." Trench loss is the amount (thickness, e.g., in Angstroms (Å)) of material removed from trenches in achieving planarization of pattern material by eliminating an initial step height. Trench loss is calculated as the initial trench thickness minus a final trench thickness. Planarization efficiency relates to the amount of step height reduction achieved per amount of trench loss that occurs, while getting to a planar surface, i.e., step height reduction divided by trench loss.

Various chemical ingredients may be used in a CMP composition to improve or control trench loss, planarization efficiency, and removal rates. Certain chemical compounds have been used on slurries to control trench loss, e.g., by controlling a removal rates; these are sometimes referred to as "inhibitors." But these inhibitors can also have the effect of reducing an active removal rate, among other potentially detrimental effects. In attempts to improve planarization efficiency, an added chemical ingredient is useful only if it does not also produce a different and overriding negative effect on the slurry or CMP process, such as instability of the slurry, an increase in defects in a processed substrate, or a substantial reduction in active removal rate.

In various dielectric polishing steps (e.g., during STI processing or when processing a NAND or 3D-NAND substrate) the rate of removal of pattern dielectric is a rate-limiting factor of the overall process. Therefore, high removal rates of pattern dielectric are needed. Also highly desired is high planarization efficiency, but only if this can be achieved without a substantial decrease in the active removal rate.

SUMMARY

Described herein are CMP compositions (aka "slurries") and method for using a CMP composition to process (e.g., planarize, polish) a surface of a substrate that includes a region of dielectric material, i.e., a substrate with at least a portion of its surface having dielectric material, especially pattern dielectric that includes raised areas and trenches. The substrate can be any substrate that includes an area of dielectric material, examples including substrates undergoing fabrication into a flat panel display, integrated circuit, memory or rigid disk, inter-layer dielectric (ILD) device, microelectromechanical system (MEMS), 3D NAND device, any device being processed by a shallow trench isolation (STI) process, among others.

Pattern dielectric is processed using CMP processing to remove raised areas of dielectric material from an "active" or "pattern" region of a substrate surface. As a step height of the patterned surface is reduced and substantially eliminated during CMP processing, mechanical interactions increase between asperities (micro surface structures) at a surface of a CMP pad and dielectric material at trenches on the surface. This results in increased removal of dielectric material at trenches, i.e., "trench loss," en route to full planarization. Minimizing trench loss while achieving the smallest possible final step height is desired, and measured as the planarization efficiency.

Also highly important in these processes is removal rate at the active region of the dielectric material. Improving planarization efficiency is only advantageous if the improvement can be achieved without a significant reduction in removal rate of dielectric material at the active region.

Planarization efficiency of CMP polishing of dielectric surfaces can be improved by including chemical additives in a CMP composition, to achieve acceptable final step height with low trench loss. Some past attempts to enhance planarization efficiency have added various alkyl-containing compounds to a CMP composition. These past attempts have typically led to a reduced removal rate of active dielectric material, if planarization efficiency is even improved. Many alkyl-containing compounds added to a CMP composition have shut down the rate of removal of dielectric material substantially or even completely, mooting any gain in planarization efficiency. Additionally, long alkyl chains of a chemical additive in an aqueous CMP composition can cause foaming during CMP processing, and may also reduce the solubility of the alkyl-containing compound in water, limiting the potential usefulness of the compound in an aqueous CMP composition. Finally, if an alkyl group interacts too strongly with abrasive particles of a CMP slurry, the alkyl-containing additive can cause particle agglomeration that leads to precipitation or settling of the abrasive particles during storage or use.

In other efforts, sugars have been added to CMP compositions in attempts to improve planarization efficiency in pattern dielectric processing. It is believed that sugar molecules may associate with dielectric material at a surface of a CMP substrate by hydrogen bonding interactions. In some instances, these hydrogen bonding interactions may be effective to improve planarization efficiency in certain specific slurries and processing environments. But an improved planarization efficiency that might exist when processing a 200 millimeter wafer is difficult to translate to processing a 300 millimeter wafer. The failure of the improved efficiency with a 300 mm wafer may be because the hydrogen bonding interaction between a sugar molecule and a dielectric substrate surface is not as strong as a Coulombic interaction, and the higher radial velocity of the larger platen when processing a 300 millimeter wafer is sufficient to overcome an interaction based only on hydrogen bonding.

Three-dimensional cyclodextrin and other "tubular" or annular clathrates compounds have been mentioned as possibly useful in certain specific CMP compositions, when present in combination with a polymer having an acid side group (or a salt thereof), and having a molecular weight in a range from 1,000 to 1,000,000, such as a poly acrylic acid. See United States Patent Publication 2012/0270400.

According to the present description, combinations of a specific type of sugar compound (cyclodextrin), with certain types of alkyl-containing compounds, e.g., certain alkylamine compounds, have been shown to be effective to improve planarization efficiency in CMP processing of a dielectric substrate (e.g., bulk oxide CMP), without an unacceptable reduction in the rate of removal of pattern dielectric material.

The development of CMP slurries for advanced dielectrics is highly competitive. Various suppliers have spent years developing ceria-based slurries for these processes. A combination of alkylamine and cyclodextrin in a slurry, as described herein, also containing ceria-based abrasive particles, affords high pattern dielectric (e.g., TEOS) removal rates, with improved planarization efficiency. Planarization efficiency is typically the single most important characteristic of a composition for bulk oxide removal because it relates to both final step height (degree of planarization) and the amount of trench loss in a single metric. A supplier that offers a CMP composition that affords the best planarization efficiency is at a considerable advantage in successfully marketing the composition.

Many chemical additive candidates that are capable of providing an improvement in planarization efficiency in bulk oxide CMP processing perform by slowing down the removal rate of dielectric material, sacrificing throughput efficiency. While this may be suitable for CMP applications in which a slower removal rate can be tolerated, a reduced active removal rate will not be useful in processing many substrates that are currently of high commercial importance, e.g., 3D NAND substrates.

Different from many previous additives for improving planarization efficiency, the combination of alkylamine and cyclodextrin described herein does not rely on a reduced removal rate to improve planarization efficiency. This important characteristic of the chemical system in this disclosure will be highly desirable to users who cannot afford a decrease in removal rate, yet still desire improved planarization efficiency. This is especially important for 3D NAND applications. For these applications the initial step height of patterned oxide features can be on the order of four microns, which means that a large amount of dielectric removal will be required to planarize the features. Large initial step heights mean that users prefer or need high removal rates to maximize throughput, and may be unwilling to accept a CMP composition in which any portion of removal rate has been reduced in favor of an increased planarization efficiency. Compositions that contain alkylamine as described herein, can exhibit an improved planarization efficiency due to the presence of the alkylamine, but have additionally been found to maintain a high dielectric removal rate (not substantially reduced relative to the removal rate present without the alkylamine) when cyclodextrin is included in combination with the alkylamine.

In more detail, a useful alkylamine compound by itself can have the effect of improving planarization efficiency. But to achieve a desired level of improvement, a relatively large amount of the alkylamine (when used without cyclodextrin) may be necessary. The large amount of alkylamine may have the undesired effect of reducing the removal rate of active dielectric material, negating the improvement in planarization efficiency. The present inventors have discovered that for a given improvement in planarization efficiency, the amount of alkylamine required to achieve that improvement can be substantially reduced by including cyclodextrin in the slurry along with the alkylamine, the alkylamine being capable of forming a complex with the cyclodextrin. The presence of the cyclodextrin in the slurry allows for a reduced level of the alkylamine to be effective in achieving the given improvement in planarization efficiency; the reduced level of alkylamine is sufficient to produce the desired improvement and can be sufficiently low to avoid a substantial reduction in removal rate of the dielectric material. For example, when the cyclodextrin is present with the alkylamine, an amount of alkylamine necessary to effect a desired improvement in planarization efficiency can be substantially less than, e.g., 50 percent of, 40, 30, or 20 percent of, the amount of the alkylamine that is effective to achieve the same desired improvement in planarization efficiency if the cyclodextrin is not also present in the slurry.

In one aspect, the invention relates to a chemical-mechanical planarization composition useful for processing dielectric material. The composition includes: liquid carrier, cationically-charged abrasive particles dispersed in the liquid carrier, cyclodextrin selected from alpha-, beta-, gamma-cyclodextrin, or a combination thereof, and alkylamine compound comprising an amine group attached to an alkyl group capable of forming a complex with the cyclodextrin in the slurry, wherein the composition has a pH below 7 and the amine group exhibits a cationic charge in the slurry.

In another aspect, the invention relates to a method of polishing a dielectric-containing surface of a substrate. The method includes: providing a substrate comprising a surface that includes dielectric material; providing a polishing pad; providing a chemical-mechanical polishing composition comprising: aqueous medium abrasive particles dispersed in the aqueous medium, alkylamine having an amine group and an alkyl group having at least 5 carbon atoms, and cyclodextrin, the composition having a pH below 7, and the amine group in the slurry having a cationic charge; contacting the substrate with the polishing pad and the chemical-mechanical polishing composition; and moving the polishing pad and the chemical-mechanical polishing composition relative to the substrate to abrade at least a portion of the dielectric layer on a surface of the substrate to polish the substrate.

DETAILED DESCRIPTION

Figure 1:
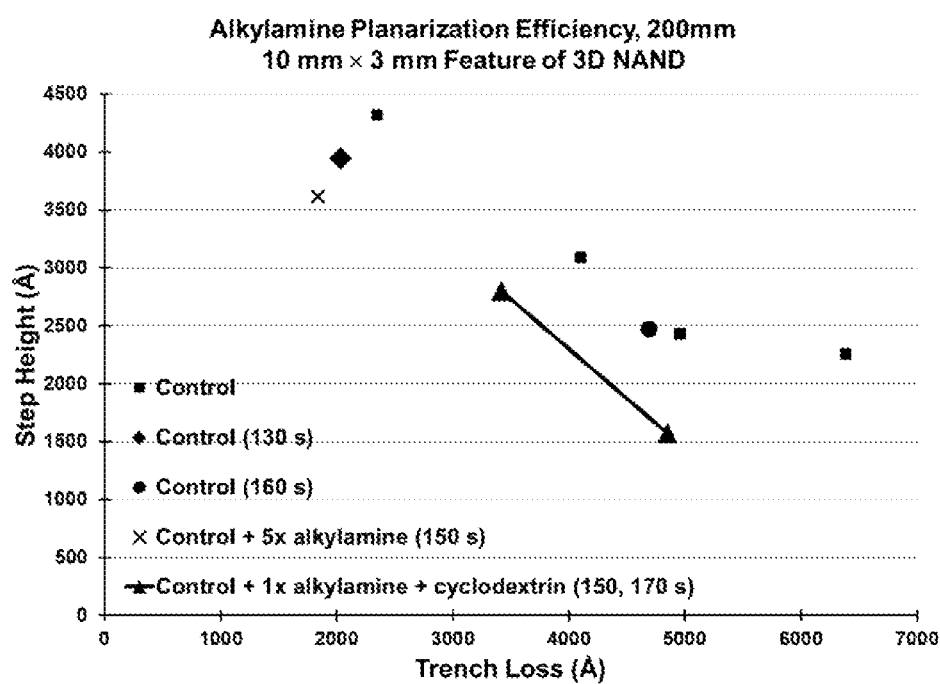
FIGS. 1 and 2 include performance information of inventive compositions.

Described as follows are "CMP compositions," also referred to as "CMP slurries," "polishing compositions," and the like, useful for removing dielectric material from a dielectric-containing surface of a substrate. The slurry is useful for CMP processing a surface of a substrate that contains a region of pattern dielectric material, including by removal processes referred to as polishing, bulk removal, and the like. Preferred slurries can be useful for bulk removal of pattern dielectric material with a high removal rate of the pattern dielectric material, combined with low trench loss and high planarization efficiency.

A slurry as described includes liquid carrier, abrasive particles dispersed in the liquid carrier, cyclodextrin, and alkylamine compound that is capable of forming a complex with the cyclodextrin. The slurry may optionally include other chemical materials, additives, or minor ingredients such as surfactant, catalyst, oxidant, inhibitor, pH-adjuster, among others.

The CMP composition includes cyclodextrin. Cyclodextrins are a family of well-known compounds made of multiple sugar molecules and formed into a three-dimensional tubular or annular ring structure, such compounds sometimes being referred to as cyclic oligosaccharides. Cyclodextrins are composed of α-D-glucopyranoside molecular units connected by a 1-4 linkage (see figure below) between the units. Forms of cyclodextrin that are useful in a polishing slurry as described include α (alpha)-cyclodextrin, which is a 6-membered ring; β (beta)-cyclodextrin, which is a 7-membered ring, and γ (gamma)-cyclodextrin, which is an 8-membered ring:

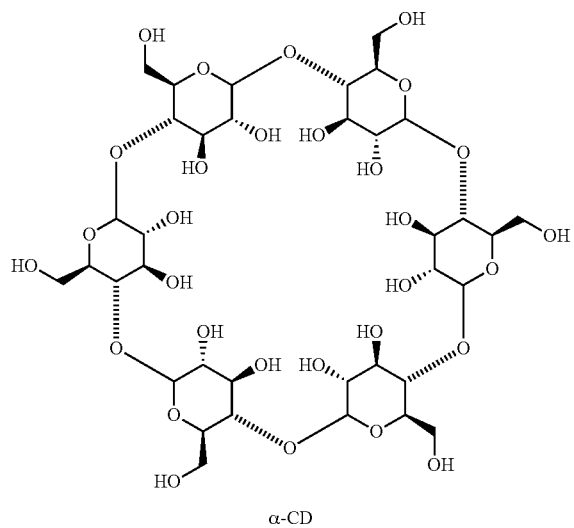

α-CD

-continued

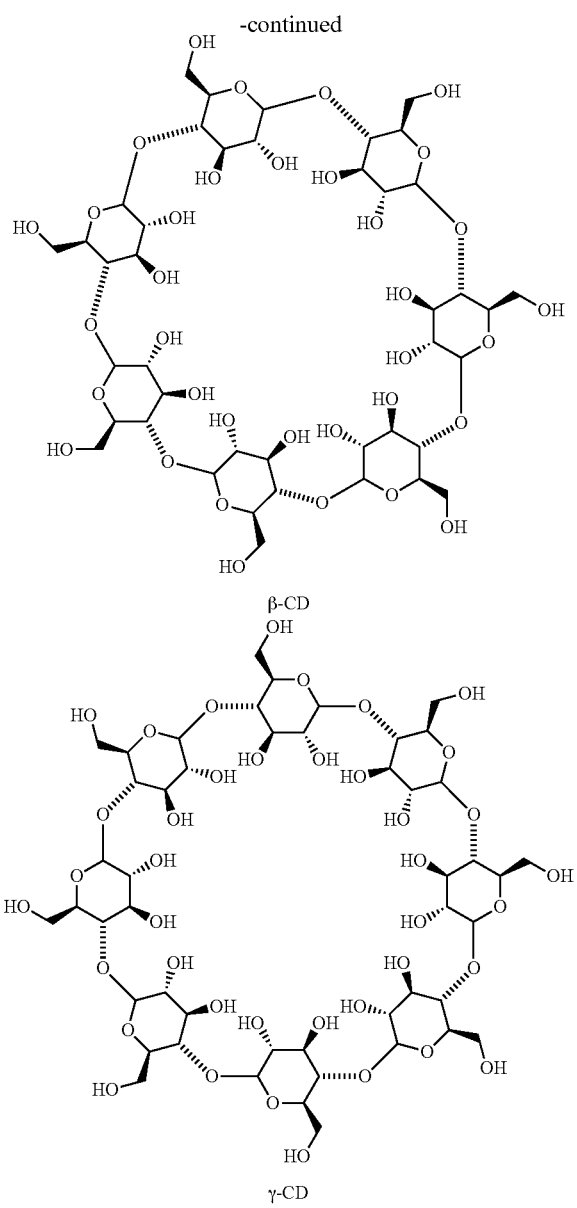

β-CD

γ-CD

The cyclodextrin can be present in the CMP composition in an amount effective to result in the presence of a desired amount of the cyclodextrin-alkylamine complex in the composition, especially to affect a performance property of the slurry such as planarization efficiency, removal rate of dielectric material, or both, relative to an otherwise identical slurry that does not contain the cyclodextrin.

According to the invention, it has been identified that when cyclodextrin is present in a CMP slurry for processing pattern dielectric, the slurry also containing alkylamine compound as described herein, the pattern dielectric removal rate can be improved due to the presence of the cyclodextrin. Stated differently, alkylamine can be useful to improve planarization efficiency, but when used alone (absent cyclodextrin) the alkylamine can also significantly reduce the removal rate of pattern dielectric. Cyclodextrin present in the slurry has been found to allow for the improved planarization efficiency provided by the alkylamine, while preventing a substantial reduction in the pattern dielectric removal rate. The cyclodextrin can allow the alkylamine to act to improve planarization efficiency, but can prevent the alkylamine from causing a significant decrease in pattern dielectric removal rate. Thus, according to preferred composition embodiments, cyclodextrin can be included in the composition in an amount that, when the slurry (which also contains alkylamine) is used in a CMP removal step of dielectric material, the removal rate of the process is increased relative to a removal rate of an identical process using a slurry that is the same but does not contain the cyclodextrin.

Particular amounts of cyclodextrin in a CMP composition may depend on factors such as the specific substrate being processed and the types and amounts of other ingredients in the slurry, such as the type and amount of abrasive particles, alkylamine, catalyst, oxidizing agent, inhibitor, etc. In certain useful embodiments, cyclodextrin can be present in the slurry in an amount in a range from about 0.01 to about 2 weight percent cyclodextrin based on the total weight of the composition, e.g., from about 0.02 to about 1.5 weight percent. These amounts are for point of use CMP compositions, and will be higher for CMP concentrate compositions.

The alkylamine compound (or simply "alkylamine" for short) can be of any type that, when present in the slurry, will form a cyclodextrin-alkylamine complex (see below), and that will at the same time produce a CMP composition that is effective to process a dielectric-containing surface of a substrate. The alkylamine can preferably be selected to produce a slurry that contains the alkylamine, the cyclodextrin, and the cyclodextrin-alkylamine complex, and that exhibits a useful or advantageous combination of processing properties such as a desired combination of planarization efficiency and desirably high removal rate of pattern dielectric.

Included in considering ingredient selection for a CMP composition for processing a dielectric-containing substrate surface is that certain types of chemical materials, including certain alkyl-containing compounds (e.g., nitrogen-containing alkyl-containing surfactants) can inhibit the removal of dielectric material such as silicon oxide (e.g., TEOS) during CMP processing. Accordingly, certain types of alkylamines may be included in a slurry as described, to improve planarization efficiency in processing a dielectric-containing substrate surface. But including the alkylamine in the slurry to improve planarization efficiency is not desired if the alkylamine also causes a substantial reduction in the removal rate for pattern dielectric. As described, including cyclodextrin in the slurry with the alkylamine can allow for the alkylamine to provide a desired improvement in planarization efficiency, but without the alkylamine causing a substantial reduction in dielectric removal rate. For example, a given improvement in planarization efficiency can be achieved with a lower amount of the alkylamine, when the cyclodextrin is also present.

Preferred alkylamine compounds can be included in a slurry as described herein, also containing the cyclodextrin, in an amount that produces a desired improvement in planarization efficiency, while not also causing an undesired reduction in the removal rate of pattern dielectric. In exemplary embodiments, the alkylamine can be present in a slurry that also contains cyclodextrin, in an amount that does not reduce the removal rate of pattern dielectric by more than 25, 15, 10, or preferably 5 percent relative to a slurry that is otherwise identical but does not contain the combination of alkylamine and cyclodextrin.

The alkylamine includes an alkyl group (identified as $R_1$ in Formula I), meaning a hydrocarbon group having a general formula $C_nH_{2n+1}$ when saturated, but which may optionally include some amount of unsaturation, e.g., 1, 2, or 3 carbon-carbon double bonds, substitution, or heteroatoms. The alkyl group includes a hydrocarbon chain that may be straight or branched. The alkyl group may be substituted or non-substituted; e.g., the alkyl group may optionally contain one or more non-hydrogen substituents such as a halogen atom, a hydroxyl group, etc., in place of a carbon-bonded hydrogen atom. The alkyl group can also include a heteroatom (oxygen, sulfur, nitrogen), and the group may be charged or uncharged. Preferred alkyl groups are uncharged, need not contain a heteroatom or substitution, and may be saturated or contain not more than a small level of unsaturation, e.g., 1, 2, or 3 carbon-carbon double bonds.

The alkylamine compound is a relatively low molecular weight molecule that is not a "polymer" or an "oligomer" as those terms are generally understood in the chemical arts. Also, the alkylamine need not and preferably does not contain an acid group or groups. Accordingly, the alkylamine compound is different from "polymer compositions" described in United States Patent Publication 2012/0270400, those polymers being of a molecular weight of at least 1,000 grams per mole and containing a pendant acid group or multiple pendant acidic groups. In contrast to the polymer compositions described in that patent publication, the alkylamine compound presently described is a relatively small molecule of a type that is considered a non-polymer and a non-oligomer compound. The molecular weight of the alkylamine can be less than 1,000 grams per mole, e.g., less than 900, 800, 700, or 500 grams per mole. To fall within this molecular weight range, the alkyl group (e.g., $R_1$ in Formula I) can contain fewer than 75 carbon atoms, e.g., not more than 50, 40, 30, or 20, carbon atoms. The presently-described alkylamine also does not require and can exclude the presence of an acidic group (e.g., carboxylic acid groups) as are described in United States Patent Publication 2012/0270400 (as side chains from a polymer backbone).

The alkyl group has chemical structure that allows the group to become located within the open, generally hydrophobic interior space of a cyclodextrin molecule, to form an alkylamine-cyclodextrin complex as described, e.g., while the alkylamine molecule is present with a cyclodextrin molecule in a slurry. To form the complex, the alkyl group may preferably be relatively straight or not highly branched so that the group is stearically and thermodynamically capable of becoming located at the hydrophobic interior of an annular cyclodextrin compound. When positioned at the interior space of a cyclodextrin molecule, the alkyl group (also substantially hydrophobic) is believed to be associated with the hydrophobic interior of the cyclodextrin molecule without a covalent or ionic chemical bond between the two molecules.

The alkyl group can also be one that results in an alkylamine compound that has a level of solubility in the liquid carrier that allows a desired amount (concentration) of the alkylamine compound to become dissolved in the CMP composition (either as a concentrate or at the point of use), with useful stability during transport, storage, and use. Higher length alkyl groups can be less soluble in an aqueous medium (i.e., aqueous carrier) compared to lower length alkyl groups.

The amine group of the alkylamine compound can be a primary amine, a secondary amine, a tertiary amine, or a quaternary ammonium. The amine group can be positively charged at a neutral to low pH, such as in when present in a slurry having a pH below 7. The pKa of the amine group can be above the pH of the slurry, during use, such that the amine group is cationic in the slurry during use, e.g., above 4, above 5, or above 8 or 9, for example within a range from about 9 to about 11 for primary alkylamine compounds.

Some non-limiting examples of alkylamines that are capable of forming a complex with cyclodextrin in a slurry, with good performance properties as described, include compounds having the structure of Formula I:

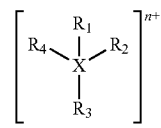

wherein:
n is an integer such as 1 or 2, preferably 1,
X is $N^+$,
$R_1$ is an uncharged, straight or branched, saturated or unsaturated (e.g., containing 1, 2, or 3 carbon-carbon double bonds) alkyl group, containing from 5 to about 75 carbon atoms,
$R_2$, $R_3$, and $R_4$ can independently be selected from:
hydrogen,
an aryl or cycloalkyl group that may be substituted or unsubstituted, that may optionally include a heteroatom, and that contains fewer than 12 carbon atoms, and
a straight or branched, saturated or unsaturated alkyl group that may be substituted or unsubstituted, that may optionally include a heteroatom, and that contains fewer than 12 carbon atoms, and
wherein two or three of $R_2$, $R_3$, and $R_4$, may form a saturated or unsaturated ring structure that may be substituted or unsubstituted, that may optionally include a heteroatom, the ring and optional substituent containing fewer than 12 carbon atoms.

In Formula I, each of $R_1$, $R_2$, $R_3$, and $R_4$ may be a alkyl group that is substituted, charged, saturated, or unsaturated, and that may contain a heteroatom. The X atom will be cationically charged in the slurry during use in a CMP process due to the slurry pH, e.g., the X atom will be $N^+$ when present in the slurry during use. A "substituted" group (e.g., a substituted alkyl) refers to a group in which a carbon-bonded hydrogen atom is replaced by a non-hydrogen atom (e.g., halide) or a functional group such as an amine, hydroxide, etc. In certain embodiments, n is 1 or 2. When n is 1 the compound is monocationic based on the presence of the X atom being a cationically charged nitrogen ion ($N^+$).

According to certain embodiments, the alkylamine can be as described in Formula I, wherein:
X is $N^+$,
$R_1$ is an uncharged, straight or branched, saturated or unsaturated, alkyl group, preferably un-substituted and preferably not containing a heteroatom, and containing from 5 to about 40 carbon atoms, and
each $R_2$, $R_3$, and $R_4$ is independently hydrogen or an alkyl (e.g., saturated alkyl, e.g., saturated straight-chain alkyl) having from 1 to 6 carbon atoms.

In other embodiments the alkylamine can be as in Formula I, wherein X is $N^+$; $R_1$ is a straight, saturated, uncharged alkyl group that contains from 5 to 30 carbon atoms; and $R_2$, $R_3$, and $R_4$ can be as described, e.g., independently selected from hydrogen and an alkyl group that contains fewer than 12 carbon atoms, such as from 1 to 6 or 1 to 3 carbon atoms. In particular such embodiments, each of $R_2$, $R_3$, and $R_4$ can be hydrogen.

In certain embodiments, $R_1$ is the only alkyl group or is the largest alkyl group of any non-hydrogen groups of $R_1$ through $R_4$ groups. $R_1$ can be considered the alkyl group of the alkylamine compound that associates with the cyclodextrin molecule to form a cyclodextrin-alkylamine complex. For example $R_1$ can contain from 5 to 75 carbon atoms, e.g., from 6 to 40, 50, or 60 carbon atoms, or from 7 to 15 or 20 carbon atoms; $R_1$ may optionally include one or more heteroatom along its carbon backbone or as a substituted group that replaces a hydrogen atom attached to the carbon backbone; and $R_1$ may be saturated or unsaturated (e.g., may contain 1, 2, or 3 carbon-carbon double bonds in a backbone), straight or branched. To facilitate $R_1$ associating with the hydrophobic interior of the cyclodextrin molecule, $R_1$ may preferably be an uncharged linear alkyl group that is saturated or mostly saturated, e.g., a linear alkyl having from 5 to 20, e.g., 6 to 18, e.g., 7 to 18 carbon atoms.

In certain embodiments each of $R_2$ $R_3$, and $R_4$, is independently hydrogen or a straight or branched alkyl group that contains fewer carbon atoms than $R_1$, e.g., not more than 8, 10, 12, or 20 carbon atoms, e.g., from 1 to 10 carbon atoms, from 1 to 8, 1 to 6, or from 1 to 4 carbon atoms. In some embodiments, all of $R_2$, $R_3$, and $R_4$ are hydrogen.

In certain embodiments the alkylamine can be selected from: pentylamine, hexylamine, heptylamine, octylamine, nonylamine, decylamine, undecylamine, dodecylamine, N-lauroyl sarcosine, tert-octylamine, N-methyl-N-octylamine, dihexylamine, N-(sec-butyl)-N-propylamine, N,N-dimethyldecylamine, larger molecules that contain these functional groups within their structure, and combinations thereof.

In contrast to alkylamine compounds described as useful or preferred, certain other alkylamine compounds are not effective to provide a preferred CMP composition as described, e.g., being capable of providing improved planarization efficiency without a substantial reduction in removal rate of pattern dielectric. Examples of these include N,N,N',N',-pentamethyl-N-tallow-1,3-propanediammonium dichloride, and several diamines such as 1,6-diaminohexane, 1,8-diaminooctane, and 1,12-diaminododecane.

The alkylamine can be included in the slurry in an amount effective to provide desired processing performance properties of the slurry when processing a dielectric-containing substrate surface, such as improved planarization efficiency. For example, the alkylamine can be included in the slurry in an amount that improves planarization efficiency as compared to an otherwise identical slurry that does not contain the same type and amount of the alkylamine. With the cyclodextrin also present in the slurry, the pattern dielectric removal rate of the slurry can also be high, e.g., not substantially reduced because of the presence of the alkylamine.

The amount of alkylamine to be used in a particular slurry may depend on factors such as the specific substrate being processed (e.g., polished) and other ingredients in the slurry. In certain useful embodiments the alkylamine can be present in the slurry at a point of use (i.e., during CMP processing), in an amount in a range from about 0.001 to about 0.5 weight percent alkylamine based on the total weight of the composition, e.g., from about 0.01 to about 0.5 weight percent alkylamine based on the total weight of the composition. These amounts are useful for CMP compositions at a point of use, e.g., a "use composition," meaning in a slurry during use in CMP processing; higher levels of the alkylamine will be present in CMP concentrate compositions.

Relative to cyclodextrin, an amount of the alkylamine can be an amount that allows for a desired amount of the complex to form in the slurry. A useful amount of alkylamine relative to cyclodextrin may be an amount that is approximately a stoichiometric amount of the cyclodextrin and the alkylamine, i.e., approximately equal molar amounts of these two compounds. For example, a molar ratio of the alkylamine to the cyclodextrin may be in a range from 0.5 to 1.5 moles alkylamine per mole cyclodextrin, e.g., from 0.75 to 1.25 moles alkylamine per mole cyclodextrin, or from about 0.9 to 1.1 moles alkylamine per mole cyclodextrin.

Alternately, according to certain embodiments wherein the alkylamine includes two alkyl substituents (e.g., $R_1$ and $R_2$ of Formula I are both alkyl groups), the molar ratio of alkylamine to cyclodextrin may be different, for example, in a range of about 2 moles cyclodextrin per mole alkylamine (having two alkyl substituents), and more generally, from 1 to 3 moles cyclodextrin per mole alkylamine, e.g., from 1.5 to 2.5 moles cyclodextrin per mole alkylamine.

In a slurry as described, the alkylamine, having a least one substituent ($R_1$ of Formula I) that contains 5 or more carbon atoms, is capable of forming a complex with the alpha-, beta-, or gamma-cyclodextrin. Without being bound by theory, an alkyl group of an alkylamine compound is capable of becoming associated with a single cyclodextrin molecule, to form a "complex." The alkyl group can become located at the hydrophobic interior space of the annular (tubular, cyclic) cyclodextrin molecule without a chemical bond (covalent or ionic) being formed between the alkyl group and the cyclodextrin. The alkylamine molecule located as such, in association with the cyclodextrin molecule, is referred to herein as the "cyclodextrin-alkylamine complex" or simply as the "complex." The complex will include the portion of the alkylamine that contains the amine group extending away from the cyclodextrin molecule.

The amount of the complex that will be present in the slurry will depend on the amount of alkylamine in the slurry, the amount of cyclodextrin in the slurry, the amount and types of other ingredients in the slurry, and the chemical identity of the alkylamine (especially the alkyl group) and its propensity to associate with and form the complex with the cyclodextrin compound at the conditions of the slurry, i.e., the equilibrium constant between the alkylamine and cyclodextrin molecules, and the complex. Preferably, a high amount of the alkylamine will become complexed with cyclodextrin, e.g., at least 50, 70, 80, 90 percent or more of the alkylamine will be part of a complex with an alkylamine. The presence of un-complexed alkylamine may have the effect of creating instability of the abrasive particles, such as by causing undesired agglomeration and particle size increase of abrasive particles during use or storage (in the form of settling). Compositions as described are preferably stable during storage and use, and as such, preferably include a high percentage of the alkylamine compound in the form of the complex. Optionally and preferably, the amount of cyclodextrin can be an amount that is stoichiometrically in excess, e.g., at least a 1, 3, or 5 percent excess of cyclodextrin per alkylamine compound (on a molar basis), to avoid the presence of un-complexed alkylamine compound.

Generally, the complex can be present in an amount effective to provide desired processing performance properties of the slurry when polishing a dielectric-containing substrate surface, such properties including a desired planarization efficiency and a desired pattern dielectric removal rate. Particular amounts of the complex may be selected based on factors such as the specific substrate being processed and other ingredients in the slurry such as the abrasive particles. In certain useful embodiments the alkylamine-cyclodextrin complex can be present in the slurry in an amount in a range from about 0.001 to about 2.5 weight percent of the complex based on the total weight of the composition, e.g., from about 0.01 to about 0.5 weight percent of the complex based on the total weight of the composition. These amounts refer to the amount of the complex in a CMP composition at a point of use; correspondingly higher concentrations of the complex will be present in a CMP concentrate.

A slurry as described can include any useful type or amount of abrasive particles. Preferred slurries include particles that are effective to polish or planarize a dielectric region of a substrate such as pattern dielectric, e.g., a pattern oxide region of a substrate surface. Examples of preferred abrasive particles include particles of ceria (e.g., $CeO_2$), zirconia (e.g., $ZrO_2$), silica (any of various forms), or a combination of these, preferably such particles having a cationic charge when present in a slurry as described having an acidic pH.

Because the slurries can be particularly useful in polishing pattern dielectric, the particles do not need to include, and can preferably exclude, any substantial amount of abrasive particles that are included for the purpose of removing a metal material such as copper, silver, tungsten, or another metal, from a substrate surface. Accordingly, abrasive particles of preferred slurries can consist of or can consist essentially of preferably cationically-charged ceria particles, zirconia particles, silica particles, or a combination of these, and can preferably exclude any more than an insubstantial amount of particles useful to polish or planarize a metal substrate surface, such particles including certain types of metal oxides known to be useful for polishing a metal surface, e.g., alumina particles. Such a slurry may contain not more than 0.1 weight percent of abrasive particles other than ceria-based, silica-based, or zirconia-based particles, based on total weight slurry, e.g., less than 0.05 or 0.01 weight percent of abrasive particles other than ceria, silica, or zirconia-based particles based on total weight slurry. Alternately stated, such a slurry may contain not more than 0.5 weight percent of abrasive particles other than ceria-based, silica-based, or zirconia-based particles per total weight abrasive particles in the slurry, e.g., less than 0.1, 0.05, or 0.01 weight percent of abrasive particles other than ceria-, silica-, or zirconia-based particles per total weight abrasive particles in the slurry. These amounts are for a CMP composition at a point of use; higher concentrations of the abrasive particles will be present in a CMP concentrate composition that is diluted for use in CMP processing.

Preferred colloidal abrasive particles have a positive charge or "zeta potential" when present in the CMP composition, at an acidic pH. A charge on particles in a CMP slurry is commonly referred to as the zeta potential (or the electrokinetic potential). The zeta potential of a particle refers to the electrical potential difference between the electrical charge of the ions surrounding the particle and the electrical charge of the bulk solution of the CMP composition (e.g., the liquid carrier and any other components dissolved therein). The zeta potential is typically dependent on the pH of the aqueous medium. For a given CMP composition, the isoelectric point of the particles is defined as the pH at which the zeta potential is zero. As the pH is increased or decreased away from the isoelectric point, the surface charge (and hence the zeta potential) is correspondingly decreased or increased (to negative or positive zeta potential values). The zeta potential of a dispersion such as a CMP composition may be obtained using the Model DT-1202 Acoustic and Electro-acoustic spectrometer available from Dispersion Technologies, Inc (Bedford Hills, N.Y.).

According to certain embodiments of the invention, the zeta potential of the abrasive particles (e.g., ceria abrasive particles) in the CMP composition can be positive when the particles are present in the composition, such as a zeta potential of at least 20 millivolts (mV), preferably a zeta potential in a range from 20 to 70 mV. The specific zeta potential can be affected by the pH of the slurry, and may be selected within a useful range based on the type of CMP process for which a CMP composition will be used. A zeta potential at a lower end of a useful range, e.g., from 20 to 40 mV, may be preferred for CMP processes that involve selective removal of dielectric, e.g., silicon oxide. A zeta potential at a lower end of a useful range, e.g., from 50 to 70 mV, may be preferred for CMP processes that involve removal of bulk dielectric material such as silicon oxide, e.g., TEOS.

Ceria particles useful for processing dielectric material are well known in the CMP arts and are commercially available. Examples include types referred to as wet-process ceria, calcined ceria, and metal-doped ceria, among others. Likewise, zirconia particles useful for polishing dielectric materials are well known in the CMP arts and are commercially available.

Examples include metal-doped zirconia and non-metal-doped zirconia, among others. Among metal-doped zirconia are cerium-, calcium-, magnesium-, and yttrium-doped zirconia with dopant element weight percentage preferentially in a range from 0.1-25 weight percent.

Certain preferred ceria particles for use in a slurry of the present description include those described in Applicant's co-pending U.S. provisional patent application Ser. No. 14/639,564, filed March, 2015, entitled "Polishing Composition Containing Ceria Abrasive." A preferred CMP composition can contain abrasive particles as described in that provisional application, including cationically-charged wet-process ceria particles. Therein, slurries are described that may contain a single type of abrasive particles or multiple different types of abrasive particles, based on size, composition, method of preparation, particle size distribution, or other mechanical or physical properties. That description and the present description refer to compositions that contain "first" abrasive particles, meaning that the composition contains at least this "first" type of abrasive particles and may optionally contain (but is not required to contain) additional abrasive particles that are different from the "first" abrasive particles.

Ceria abrasive particles can be made by a variety of different processes. For example, ceria abrasive particles can be precipitated ceria particles or condensation-polymerized ceria particles, including colloidal ceria particles.

As one more particular example, ceria abrasive particles (e.g., as first abrasive particles) can be wet-process ceria particles made according to the following process. A first step in synthesizing wet-process ceria particles can be to dissolve a ceria precursor in water. The ceria precursor can be any suitable ceria precursor, and can include a cerium salt having a cerium ion of any suitable charge, e.g., $Ce^{3+}$ or $Ce^{4+}$. Suitable ceria precursors include, for example, cerium III nitrate, cerium IV ammonium nitrate, cerium III carbonate, cerium IV sulfate, and cerium III chloride. Preferably, the ceria precursor is cerium III nitrate.

The pH of the ceria precursor solution can be increased to form amorphous $Ce(OH)_3$. The pH of the solution can be increased to any suitable pH, for example to a pH of about 10 or more, e.g., a pH of about 10.5 or more, a pH of about 11 or more, or a pH of about 12 or more. Typically, the solution will have a pH of about 14 or less, e.g., a pH of about 13.5 or less, or a pH of about 13 or less. Any suitable base can be used to increase the pH of the solution. Suitable bases include, for example, KOH, NaOH, $NH_4OH$, and tetramethylammonium hydroxide. Organic bases such as ethanolamine and diethanolamine are also suitable. The solution will become white and cloudy as the pH increases and amorphous $Ce(OH)_3$ is formed.

The ceria precursor solution typically is mixed for several hours, such as for about 1 hour or more, e.g., about 2 hours or more, about 4 hours or more, about 6 hours or more, about 8 hours or more, about 12 hours or more, about 16 hours or more, about 20 hours or more, or about 24 hours or more. Typically, the solution is mixed for about 1 hour to about 24 hours, e.g., about 2 hours, about 8 hours, or about 12 hours. When mixing is complete, the solution can be transferred to a pressurized vessel and heated.

The ceria precursor solution can then be heated to any suitable temperature. For example, the solution can be heated to a temperature of about 50° C. or more, e.g., about 75° C. or more, about 100° C. or more, about 125° C. or more, about 150° C. or more, about 175° C. or more, or about 200° C. or more. Alternatively, or in addition, the solution can be heated to a temperature of about 500° C. or less, e.g., about 450° C. or less, about 400° C. or less, about 375° C. or less, about 350° C. or less, about 300° C. or less, about 250° C. or less, about 225° C., or about 200° C. or less. Thus, the solution can be heated to a temperature within a range bounded by any two of the aforementioned endpoints. For example, the solution can be heated to a temperature of about 50° C. to about 300° C., e.g., about 50° C. to about 275° C., about 50° C. to about 250° C., about 50° C. to about 200° C., about 75° C. to about 300° C., about 75° C. to about 250° C., about 75° C. to about 200° C., about 100° C. to about 300° C., about 100° C. to about 250° C., or about 100° C. to about 225° C.

The ceria precursor solution typically is heated for several hours. For example, the solution can be heated for about 1 hour or more, e.g., about 5 hours or more, about 10 hours or more, about 25 hours or more, about 50 hours or more, about 75 hours or more, about 100 hours or more, or about 110 hours or more. Alternately, or in addition, the solution can be heated for about 200 hours or less, e.g., about 180 hours or less, about 165 hours or less, about 150 hours or less, about 125 hours or less, about 115 hours or less, or about 100 hours or less. Thus, the solution can be heated for a time period bounded by any two of the aforementioned endpoints.

For example, the solution can be heated for about 1 hour to about 150 hours, e.g., about 5 hours to about 130 hours, about 10 hours to about 120 hours, about 15 hours to about 115 hours, or about 25 hours to about 100 hours.

After heating, the ceria precursor solution can be filtered to separate the precipitated ceria particles. The precipitated particles can be rinsed with excess water to remove unreacted ceria precursor. The mixture of precipitated particles and excess water can be filtered following each rinse step to remove impurities. Once adequately rinsed, the ceria particles can be dried for additional processing, e.g., sintering, or the ceria particles can be directly redispersed.

The ceria particles optionally can be dried and sintered prior to redispersion. The terms "sintering" and "calcining" are used interchangeably herein to refer to the heating of the ceria particles under the conditions described below. Sintering the ceria particles impacts their resulting crystallinity. Without wishing to be bound by any particular theory, it is believed that sintering the ceria particles at high temperatures and for extended periods of time reduces defects in the crystal lattice structure of the particles. Any suitable method can be used to sinter the ceria particles. As an example, the ceria particles can be dried, and then can be sintered at an elevated temperature. Drying can be carried out at room temperature, or at an elevated temperature. In particular, drying can be carried out at a temperature of about 20° C. to about 40° C., e.g., about 25° C., about 30° C., or about 35° C. Alternatively, or in addition, drying can be carried out at an elevated temperature of about 80° C. to about 150° C., e.g., about 85° C., about 100° C., about 115° C., about 125° C., or about 140° C. After the ceria particles have been dried, they can be ground to create a powder. Grinding can be carried out using any suitable grinding material, such as zirconia.

The ceria particles can be sintered in any suitable oven, and at any suitable temperature. For example, the ceria particles can be sintered at a temperature of about 200° C. or more, e.g., about 215° C. or more, about 225° C. or more, about 250° C. or more, about 275° C. or more, about 300° C. or more, about 350° C. or more, or about 375° C. or more. Alternatively, or in addition, the ceria particles can be sintered at a temperature of about 1000° C. or less, e.g., about 900° C. or less, about 750° C. or less, about 650° C. or less, about 550° C. or less, about 500° C. or less, about 450° C. or less, or about 400° C. or less. Thus, the ceria particles can be sintered at a temperature bounded by any two of the aforementioned endpoints. For example, the ceria particles can be sintered at a temperature of about 200° C. to about 1000° C., e.g., about 250° C. to about 800° C., about 300° C. to about 700° C., about 325° C. to about 650° C., about 350° C. to about 600° C., about 350° C. to about 550° C., about 400° C. to about 550° C., about 450° C. to about 800° C., about 500° C. to about 1000° C., or about 500° C. to about 800° C.

The ceria particles can be sintered for any suitable length of time. For example, the ceria particles can be sintered for about 1 hour or more, e.g., about 2 hours or more, about 5 hours or more, or about 8 hours or more. Alternatively, or in addition, the ceria particles can be sintered for about 20 hours or less, e.g., about 18 hours or less, about 15 hours or less, about 12 hours or less, or about 10 hours or less. Thus, the ceria particles can be sintered for a time period bounded by any two of the aforementioned endpoints. For example, the ceria particles can be sintered for about 1 hour to about 20 hours, e.g., about 1 hour to about 15 hours, about 1 hour to about 10 hours, about 1 hour to about 5 hours, about 5 hours to about 20 hours, or about 10 hours to about 20 hours.

Ceria particles also can be sintered at various temperatures and for various lengths of time within the ranges described above. For example, the ceria particles can be sintered in a zone furnace, which exposes the ceria particles to one or more temperatures for various lengths of time. As an example, the ceria particles can be sintered at a temperature of about 200° C. to about 1000° C. for about 1 hour or more, and then can be sintered at a different temperature that is within the range of about 200° C. to about 1000° C. for about 1 hour or more.

After drying, grinding, and optional sintering, etc., ceria particles can be redispersed in a suitable liquid carrier, e.g., an aqueous carrier, particularly water. If the ceria particles are sintered, then the ceria particles are redispersed after the completion of sintering. Any suitable process can be used to redisperse the ceria particles. Typically, the ceria particles are redispersed by lowering the pH of a mixture of the ceria particles and water using a suitable acid. As pH is lowered, the surfaces of ceria particles develop a cationic zeta potential. This cationic zeta potential creates repulsive forces between the ceria particles, which facilitates their redispersion. Any suitable acid can be used to lower the pH of the mixture. Examples of suitable acids include hydrochloric acid and nitric acid. Organic acids that are highly water-soluble and have hydrophilic functional groups also are suitable. Suitable organic acids include, for example, acetic acid, among others. Acids with multivalent anions, such as $H_3PO_4$ and $H_2SO_4$, generally are not preferred. The mixture can be lowered to any suitable pH. For example, the pH of the mixture can be lowered to about 2 to about 5, e.g., about 2.5, about 3, about 3.5, about 4, or about 4.5. Typically, the pH of the mixture is not lowered to less than about 2.

The redispersed ceria particles may be milled to reduce their particle size. Preferably, ceria particles can be milled simultaneously with redispersion. Milling can be carried out using any suitable milling material, such as zirconia. Milling also can be carried out using sonication or wet-jet procedures. After milling, the ceria particles can be filtered to remove any remaining large particles. For example, the ceria particles can be filtered using a filter having a pore size of about 0.3 μm or more, e.g., about 0.4 μm or more, or about 0.5 μm or more.

Certain preferred abrasive particles (e.g., first abrasive particles) can have a median particle size of about 40 nm to about 100 nm. The particle size of a particle is the diameter of the smallest sphere that encompasses the particle. Particle size can be measured using any of various known and suitable techniques. For example, particle size can be measured using a disc centrifuge, i.e., by differential centrifugal sedimentation (DCS). Suitable disc centrifuge particle size measurement instruments are commercially available, such as from CPS Instruments (Prairieville, La.), e.g., CPS Disc Centrifuge Model DC24000UHR. Unless specified otherwise, the median particle size values reported and claimed herein are based on disc centrifuge measurements.

Preferred ceria abrasive particles (e.g., first abrasive particles) can have a median particle size of about 40 nm or more, e.g., about 45 nm or more, about 50 nm or more, about 55 nm or more, about 60 nm or more, about 65 nm or more, about 70 nm or more, about 75 nm or more, or about 80 nm or more. Alternatively, or in addition, ceria abrasive particles can have a median particle size of about 100 nm or less, e.g., about 95 nm or less, about 90 nm or less, about 85 nm or less, about 80 nm or less, about 75 nm or less, about 70 nm or less, or about 65 nm or less. Thus, ceria abrasive particles can have a median particle size within a range bounded by any two of the aforementioned endpoints. For example, ceria abrasive particles (e.g., first abrasive particles) can have a median particle size of about 40 nm to about 100 nm, e.g., about 40 nm to about 80 nm, about 40 nm to about 75 nm, about 40 nm to about 60 nm, about 50 nm to about 100 nm, about 50 nm to about 80 nm, about 50 nm to about 75 nm, about 50 nm to about 70 nm, about 60 nm to about 100 nm, about 60 nm to about 80 nm, about 60 nm to about 85 nm, or about 65 nm to about 75 nm. Preferred abrasive particles (e.g., first abrasive particles) can have a median particle size of about 60 nm to about 80 nm, e.g., a median particle size of about 65 nm, a median particle size of about 70 nm, or a median particle size of about 75 nm.

Abrasive particles (e.g., first abrasive particles) can be present in a CMP composition at any useful concentration (e.g., per total weight of the concentration). An exemplary range of useful concentrations (e.g., at a point of use) can be from about 0.005 to about 2 weight percent of the CMP composition. For example, first abrasive particles can be present in a CMP composition at a concentration of about 0.005 weight percent or more, e.g., about 0.0075 weight percent or more, about 0.01 weight percent or more, about 0.025 weight percent or more, about 0.05 weight percent or more, about 0.075 weight percent or more, about 0.1 weight percent or more, or about 0.25 weight percent or more. Alternately, or in addition, first abrasive particles can be present in a CMP composition at a concentration of about 2 weight percent or less, e.g., about 1.75 weight percent or less, about 1.5 weight percent or less, about 1.25 weight percent or less, about 1 weight percent or less, about 0.75 weight percent or less, about 0.5 weight percent or less, or about 0.25 weight percent or less. Thus, abrasive particles (e.g., first abrasive particles) can be present in a CMP composition at a concentration within a range bounded by any two of the aforementioned endpoints. For example, abrasive particles (e.g., first abrasive particles) can be present in the CMP composition at a concentration of about 0.005 weight percent to about 2 weight percent, e.g., about 0.005 weight percent to about 1.75 weight percent, about 0.005 weight percent to about 1.5 weight percent, about 0.005 weight percent to about 1.25 weight percent, about 0.005 weight percent to about 1 weight percent, about 0.01 weight percent to about 2 weight percent, about 0.01 weight percent to about 1.5 weight percent, about 0.05 weight percent to about 2 weight percent, about 0.05 weight percent to about 1.5 weight percent, about 0.1 weight percent to about 2 weight percent, about 0.1 weight percent to about 1.5 weight percent, or about 0.1 weight percent to about 1 weight percent based on total weight slurry. These concentrations may be for the CMP composition slurry at a point of use; higher concentration can be included in a CMP concentrate.

Certain preferred slurry types can contain first abrasive particles at a low end of this range, such as from about 0.1 weight percent to about 0.5 weight percent based on total weight CMP composition, e.g., about 0.15 weight percent to about 0.4 weight percent, about 0.15 weight percent to about 0.35 weight percent, or about 0.2 weight percent to about 0.3 weight percent. More preferably, a slurry may contain first abrasive particles at a concentration of about 0.1 weight percent to about 0.3 weight percent, e.g., about 0.1 weight percent, about 0.15 weight percent, about 0.2 weight percent, about 0.25 weight percent.

Preferred first abrasive particles can have a particle size distribution of at least about 300 nm. Particle size distribution refers to the difference between the particle size of the largest particle and the particle size of the smallest particle. For example, first abrasive particles can have a particle size distribution of at least about 315 nm, e.g., at least about 320 nm, at least about 325 nm, at least about 330 nm, at least about 340 nm, at least about 350 nm, at least about 355 nm, at least about 360 nm, at least about 365 nm, at least about 370 nm, at least about 375 nm, or at least about 380 nm. Preferably, first abrasive particles have a particle size distribution of at least about 320 nm, e.g., at least about 325 nm, at least about 335 nm, or at least about 350 nm. First abrasive particles can also preferably have a particle size distribution of about not greater than 500 nm, e.g., about 475 nm or less, about 450 nm or less, about 425 nm or less, or about 415 nm or less. Thus, abrasive particles (e.g., first abrasive particles) can have a particle size distribution within a range bounded by any two of the aforementioned endpoints. For example, abrasive particles can have a particle size distribution of about 315 nm to about 500 nm, e.g., about 320 nm to about 480 nm, about 325 nm to about 475 nm, about 335 nm to about 460 nm, or about 340 nm to about 450 nm.

The first abrasive particles as described can have any suitable largest particle size and any suitable smallest particle size, with preferred particles having a particle size distribution of is at least about 300 nm. For example, the abrasive particles can have a smallest particle size of about 1 nm to about 50 nm, e.g., about 1 nm to about 40 nm, about 1 nm to about 30 nm, about 1 nm to about 25 nm, about 1 nm to about 20 nm, about 5 nm to about 25 nm, or about 10 nm to about 25 nm. Preferably, the first abrasive particles have a smallest particle size of about 10 nm to about 30 nm, e.g., about 15 nm, about 20 nm, or about 25 nm. Abrasive particles can have a largest particle size of about 250 nm to about 500 nm, e.g., about 250 nm to about 450 nm, about 250 nm to about 400 nm, about 300nm to about 500 nm, or about 300 nm to about 400 nm. Preferably, the first abrasive particles have a largest particle size of about 350 nm to about 450 nm, e.g., about 375 nm, about 400 nm, or about 425 nm.

A CMP composition can optionally contain additional abrasive particles (e.g., second abrasive particles, third abrasive particles, etc.). Additional abrasive particles can be, for example, metal oxide abrasive particles of a different metal than the first abrasive particles, such as metal oxide abrasive particles of, titania (e.g., titanium dioxide), germania (e.g., germanium dioxide, germanium oxide), magnesia (e.g., magnesium oxide), nickel oxide, co-formed products thereof, or combinations thereof. The additional abrasive particles also can be organic particles of gelatin, latex, cellulose, polystyrene, or polyacrylate. Alternately, the CMP composition can contain first abrasive particles that are wet-process ceria particles having a median particle size of about 40 nm to about 100 nm and a particle size distribution of at least about 300 nm, wherein the CMP composition does not include any additional (second or third) abrasive particles.

The additional abrasive particles also can be metal oxide abrasive particles of ceria (e.g., cerium oxide) that are a different type of ceria as compared to first abrasive particles of the CMP composition, i.e., ceria particles that are not wet-process ceria particles, such as fumed ceria particles or calcined ceria particles. Alternatively, the CMP composition can contain first abrasive particles that are wet-process ceria particles having a median particle size of about 40 nm to about 100 nm and a particle size distribution of at least about 300 nm, wherein the CMP composition does not include any additional ceria particles.

When the CMP composition includes additional abrasive particles (e.g., second abrasive particles, third abrasive particles, etc.), the additional abrasive particles can have any suitable median particle size. For example, the CMP composition can include second abrasive particles having a median particle size of about 1 nm to about 60 nm, e.g., about 1 nm to about 55 nm, about 1 nm to about 50 nm, about 1 nm to about 40 nm, about 1 nm to about 35 nm, about 1 nm to about 30 nm, about 1 nm to about 25 nm, about 1 nm to about 20 nm, about 5 nm to about 50 nm, about 5 nm to about 35 nm, or about 15 nm to about 30 nm. Alternately, second abrasive particles can have a median particle size of about 100 nm to about 350 nm, e.g., about 100 nm to about 300 nm, about 105 nm to about 350 nm, about 115 nm to about 350 nm, about 135 nm to about 325 nm, about 150 nm to about 315 nm, about 175 nm to about 300 nm, about 200 nm to about 275 nm, or about 225 nm to about 250 nm. Preferably, additional abrasive particles (e.g., second abrasive particles, third abrasive particles, etc.) can have a median particle size of about 1 nm to about 35 nm, or a median particle size of about 125 nm to about 300 nm.

Additional abrasive particles (e.g., second abrasive particles, third abrasive particles, etc., in total) can be present in the CMP composition at any suitable amount, in addition to first abrasive particles. In certain slurry embodiments, additional abrasive particles can be present at a concentration of about 0.005 weight percent to about 2 weight percent based on total weight of the slurry. For example, additional abrasive particles can be present in a CMP composition at a concentration of about 0.005 weight percent or more, e.g., about 0.0075 weight percent or more, about 0.01 weight percent or more, about 0.025 weight percent or more, about 0.05 weight percent or more, about 0.075 weight percent or more, about 0.1 weight percent or more, or about 0.25 weight percent or more. Alternately, or in addition, additional abrasive particles can be present in a CMP composition at a concentration of about 2 weight percent or less, e.g., about 1.75 weight percent or less, about 1.5 weight percent or less, about 1.25 weight percent or less, about 1 weight percent or less, about 0.75 weight percent or less, about 0.5 weight percent or less, or about 0.25 weight percent or less based on total weight of the slurry. Thus, additional abrasive particles can be present in a CMP composition at a concentration within a range bounded by any two of the aforementioned endpoints. For example, a preferred CMP composition can include (in addition to an amount of first abrasive particles as described) second abrasive particles at a concentration of about 0.005 weight percent to about 2 weight percent, e.g., about 0.005 weight percent to about 1.75 weight percent, about 0.005 weight percent to about 1.5 weight percent, about 0.005 weight percent to about 1.25 weight percent, about 0.005 weight percent to about 1 weight percent, about 0.01 weight percent to about 2 weight percent, about 0.01 weight percent to about 1.75 weight percent, about 0.01 weight percent to about 1.5 weight percent, about 0.05 weight percent to about 2 weight percent, about 0.05 weight percent to about 1.5 weight percent, about 0.1 weight percent to about 2 weight percent, or about 0.1 weight percent to about 1.5 weight percent. More preferably, the additional abrasive particles can be present at a concentration of about 0.01 weight percent to about 0.5 weight percent, e.g., about 0.025 weight percent, about 0.05 weight percent, about 0.08 weight percent, about 0.1 weight percent, about 0.15 weight percent, about 0.2 weight percent, about 0.25 weight percent, about 0.3 weight percent, or about 0.4 weight percent, based on total weight of the slurry.

The first abrasive particles and any additional abrasive particles present in the CMP composition desirably are suspended in the CMP composition, more specifically in the aqueous carrier of the CMP composition. When the abrasive particles are suspended in the CMP composition, the abrasive particles preferably are colloidally stable. The term colloid refers to the suspension of abrasive particles in the aqueous carrier. Colloidal stability refers to the maintenance of that suspension over time. In the context of this invention, abrasive particles are considered colloidally stable if, when the abrasive particles are placed in a 100 ml graduated cylinder and allowed to stand unagitated for a time of 2 hours, the difference between the concentration of particles in the bottom 50 ml of the graduated cylinder ([B] in terms of g/ml) and the concentration of particles in the top 50 ml of the graduated cylinder ([T] in terms of g/ml) divided by the initial concentration of particles in the abrasive composition ([C] in terms of g/ml) is less than or equal to 0.5 (i.e., {[B]-[T]}/[C]<0.5). The value of [B]-[T]/[C] desirably is less than or equal to 0.3, and preferably is less than or equal to 0.1.

The CMP composition can exhibit a pH that is below about 7, e.g., from about 1 to about 6. Typically, the CMP composition has a pH of about 2 or greater. Also, the pH of the CMP composition typically is about 6 or less. For example, the pH can be in the range of about 1, 2, 3, or 3.5 to about 6, e.g., a pH of about 3.5, a pH of about 4, a pH of about 4.5, a pH of about 5, a pH of about 5.5, a pH of about 6, or a pH in a range defined by any two of these pH values.

A CMP composition may optionally include a pH-adjusting agent, which can be any suitable pH-adjusting agent. For example, the pH-adjusting agent can be an inorganic base, an alkyl amine, an alcohol amine, quaternary amine hydroxide, ammonia, or a combination thereof. In particular, the pH-adjusting agent can be potassium hydroxide, triethanolamine, tetramethylammonium hydroxide (TMAH or TMA-OH), or tetraethylammonium hydroxide (TEAH or TEA-OH). In certain preferred embodiments the pH-adjusting agent can be triethanolamine.

The pH of the polishing composition may be achieved or maintained by including an acidic compound. Suitable acidic pH adjusting agents may include acetic acid, nitric acid, perchloric acid, sulfuric acid, phosphoric acid, phthalic acid, citric acid, adipic acid, oxalic acid, malonic acid, maleic acid, and others. Suitable buffering agents may include phosphates, sulfates, acetates, malonates, oxalates, borates, ammonium salts, and the like.

The CMP composition includes an aqueous carrier that contains water (e.g., deionized water) and may optionally contain one or more water-miscible organic solvents. Examples of organic solvents that can be used include alcohols such as propenyl alcohol, isopropyl alcohol, ethanol, 1-propanol, methanol, 1-hexanol, and the like; aldehydes such as acetylaldehyde and the like; ketones such as acetone, diacetone alcohol, methyl ethyl ketone, and the like; esters such as ethyl formate, propyl formate, ethyl acetate, methyl acetate, methyl lactate, butyl lactate, ethyl lactate, and the like; ethers including sulfoxides such as dimethyl sulfoxide (DMSO), tetrahydrofuran, dioxane, diglyme, and the like; amides such as N,N-dimethylformamide, dimethylimidazolidinone, N-methylpyrrolidone, and the like; polyhydric alcohols and derivatives of the same such as ethylene glycol, glycerol, diethylene glycol, diethylene glycol monomethyl ether, and the like; and nitrogen-containing organic compounds such as acetonitrile, amylamine, isopropylamine, imidazole, dimethylamine, and the like. Preferably, the aqueous carrier is water alone without the presence of organic solvent or with only an insignificant amount of organic solvent, such as less than 0.1, 0.05, 0.01, or 0.005 weight percent organic solvent.

The CMP composition can include additional ingredients as additives. Examples of optional additives include a nonionic polymer such as a polyvinylpyrrolidone, polyethylene glycol (e.g., polyethylene glycol), or polyvinylalcohol (e.g., a copolymer of 2-hydroxyethylmethacrylic acid and methacrylic acid), a cationic compound, picolinic acid, an N-oxide of a functionalized pyridine (e.g., picolinic acid N-oxide); a starch; or combinations of two or more of these.

Polyvinylpyrrolidone can be useful as an additive, and can have any suitable molecular weight. For example, polyvinylpyrrolidone as an additive can have a molecular weight about 10,000 grams per mole (g/mol) to about 1,000,000 g/mol, e.g., up to or about 20,000 g/mol, 30,000 g/mol, 40,000 g/mol, 50,000 g/mol, or 60,000 g/mol.

When a slurry includes nonionic polymer as an additive, and when the nonionic polymer is polyethylene glycol, the polyethylene glycol can have any suitable molecular weight. For example, the polyethylene glycol can have a molecular weight of about 200 g/mol to about 200,000 g/mol, e.g., about 8000 g/mol, about 100,000 g/mol.

An additive or additives can be present in a CMP composition as described at any suitable concentration. Preferably, additive or additives are present in the CMP composition at a concentration of about 1 ppm to about 500 ppm, e.g., about 5 ppm to about 400 ppm, about 10 ppm to about 400 ppm, about 15 ppm to about 400 ppm, about 20 ppm to about 400 ppm, about 25 ppm to about 400 ppm, about 10 ppm to about 300 ppm, about 10 ppm to about 250 ppm, about 30 ppm to about 350 ppm, about 30 ppm to about 275 ppm, about 50 ppm to about 350 ppm, or about 100 ppm to about 300 ppm. More preferably, additive or additives are present in the CMP composition at a concentration of about 1 ppm to about 300 ppm, e.g., about 1 ppm to about 275 ppm, about 1 ppm to about 250 ppm, about 1 ppm to about 100 ppm, about 1 ppm to about 50 ppm, about 10 ppm to about 250 ppm, about 10 ppm to about 100 ppm, or about 35 ppm to about 250 ppm.

In particular embodiments, picolinic acid can be included in the slurry. The amount of picolinic acid may be any desired amount, such as an amount in a range from 1 ppm to 1,000 ppm, e.g., from 100 ppm to about 800 ppm, such as from 250 ppm to 750 ppm.

The CMP composition optionally can include a cationic polymer selected from a quaternary amine, a cationic polyvinyl alcohol, a cationic cellulose, and combinations thereof, in addition to one or more of the additives described above, i.e., one or more of an anionic copolymer of a carboxylic acid monomer, sulfonated monomer or a phosphonated monomer, and an acrylate; a polyvinylpyrrolidone or a polyvinylalcohol; polyethylene glycol; a nonionic polymer; a silane; an N-oxide of a functionalized pyridine; a starch; and a cyclodextrin. Alternatively, the CMP composition can include a cationic polymer without one or more of these additives described above.

A cationic polymer can be a polymer containing a quaternary amine group or made of quaternary amine monomers. For example, a cationic polymer can be a selected from poly(vinylimidazolium), a poly(methacryloyloxyethyltrimethylammonium) halide such as poly(methacryloyloxyethyltrimethylammonium) chloride (polyMADQUAT), a poly(diallyldimethylammonium) halide such as poly(diallyldimethylammonium) chloride (polyDADMAC), and polyquaternium-2. Preferably, when the cationic polymer is a quaternary amine polymer, the cationic polymer is poly(vinylimidazolium).

Alternately, a cationic polymer can be any suitable cationic polyvinyl alcohol or cationic cellulose. Preferably, the cationic polymer is a cationic polyvinyl alcohol. For example, the cationic polyvinyl alcohol can be the Nippon Gosei GOHSEFIMER K210™ polyvinyl alcohol product.

A cationic polymer (e.g., quaternary amine polymer, the cationic polyvinyl alcohol, the cationic cellulose, or a combination thereof, in total) can be present in a CMP composition at any suitable concentration, for example at a concentration of about 1 ppm to about 250 ppm, e.g., about 1 ppm to about 100 ppm, about 1 ppm to about 50 ppm, about 1 ppm to about 40 ppm, about 1 ppm to about 25 ppm, about 5 ppm to about 225 ppm, about 5 ppm to about 100 ppm, about 5 ppm to about 50 ppm, about 10 ppm to about 215 ppm, about 10 ppm to about 100 ppm, about 15 ppm to about 200 ppm, about 25 ppm to about 175 ppm, about 25 ppm to about 100 ppm, or about 30 ppm to about 150 ppm.

When the cationic polymer is poly(vinylimidazolium), the cationic polymer can preferably be present in a CMP composition at a concentration of about 1 ppm to about 10 ppm, e.g., about 2 ppm, about 5 ppm, about 6 ppm, about 7 ppm, about 8 ppm, or about 9 ppm. More preferably, when the cationic polymer is poly(vinylimidazolium), the cationic polymer can preferably be present in the CMP composition at a concentration of about 1 ppm to about 5 ppm, e.g., about 2 ppm, about 3 ppm, or about 4 ppm.

The CMP composition can also, optionally, include a carboxylic acid. The carboxylic acid can be any suitable carboxylic acid, e.g., having a pKa of about 1 to about 6, e.g., from about 2 to about 6, such as from about 3.5 to about 5. Examples of useful carboxylic acids include acetic acid, propionic acid, and butanoic acid.

A carboxylic acid can be present in the CMP composition at any suitable concentration. Preferably, the carboxylic acid is present in the CMP composition at a concentration of about 10 ppm to about 1000 ppm, e.g., about 10 ppm to about 500 ppm, about 10 ppm to about 250 ppm, about 25 ppm to about 750 ppm, about 25 ppm to about 500 ppm, about 25 ppm to about 250 ppm, about 30 ppm to about 250 ppm, about 35 ppm to about 350 ppm, about 50 ppm to about 425 ppm, about 55 ppm to about 400 ppm, or about 75 ppm to about 350 ppm. More preferably, the carboxylic acid can be present in the CMP composition at a concentration of about 25 ppm to about 150 ppm, e.g. about 40 ppm, about 50 ppm, about 60 ppm, about 75 ppm, about 100 ppm, or about 125 ppm.

Desirably, the pH of the CMP composition can be within about 2 units of the pKa of the carboxylic acid. As an example, if the pH of the CMP composition is about 3.5, the pKa of the carboxylic acid preferably is about 1.5 to about 5.5.

When the CMP composition includes cationic polymer, and when the cationic polymer is a quaternary amine polymer, the CMP composition preferably also includes a carboxylic acid. When the CMP composition includes cationic polymer, and the cationic polymer is selected from a cationic polyvinyl alcohol and a cationic cellulose, the CMP composition optionally further includes a carboxylic acid.

A CMP composition may optionally include one or more other additives such as a surfactant or rheological control agent, including viscosity enhancing agents and coagulants (e.g., polymeric rheological control agents, such as, for example, urethane polymers), a dispersant, a biocide (e.g., KATHON™ LX), or the like. Examples of surfactants include, for example, alkylamines, anionic surfactants, anionic polyelectrolytes, nonionic surfactants, amphoteric surfactants, fluorinated surfactants, mixtures thereof. These additives or agents may be included in the slurry, if their presence does not produce an undesired negative effect on one or more of the performance properties of the slurry, such as removal rate of pattern dielectric.

A CMP composition can be prepared by combining ingredients in any useful manner, many examples of which are known to those of skill. The CMP composition can be prepared in a batch or continuous process. Generally, the CMP composition can be prepared by combining its components in any order, with suitable mixing, to produce a uniform mixture (slurry) of the components. The term "component" as used herein includes individual ingredients (e.g., first abrasive particles, alkylamine, cyclodextrin, pH-adjusting agent, etc.) as well as any combination of ingredients.

For example, ingredients that include the cyclodextrin and alkylamine can be added to water at a desired concentration. The pH of the resultant aqueous solution can then be adjusted (as desired) and abrasive particles can be added to the solution at a desired concentration. Other ingredients can also be incorporated into the solution at a time to allow uniform incorporation of the ingredients. The order of addition of ingredients can be any that results in the formation of an effective amount of the complex. While the order of addition of ingredients is not limited a series steps may optionally allow the alkylamine and cyclodextrin to combine to form the complex in an early step, before most of the other ingredients are present in the composition.

A CMP composition can be prepared soon or immediately prior to its use in a CMP process, with one or more components added to the CMP composition soon or shortly before use (e.g., within about 1 minute before use, or within about 1 hour before use, or within about 7 days before use). A CMP composition also can be prepared by mixing the components at the surface of the substrate during a CMP polishing operation or immediately before applying the slurry to a substrate.

In alternate embodiments, a CMP composition can be provided as a concentrate (or "CMP concentrate" or "CMP composition concentrate") that is designed to be transported or stored commercially, then diluted for use with an appropriate amount of aqueous carrier, particularly water, at a time shortly before use. In these embodiments, the CMP composition concentrate can include first abrasive particles, removal rate accelerator, pH-adjusting agent, and water, in amounts such that, upon dilution of the concentrate with an appropriate amount of water, each component of the CMP composition will be present in the diluted CMP composition in an amount within a range specified hereinabove for a CMP composition at a point of use (i.e., a "use composition"). Furthermore, the concentrate can contain a fraction of the aqueous carrier (e.g., water) present in the CMP composition during use, to ensure that other components are at least partially or fully dissolved in the concentrate.

While a CMP composition can be prepared well before, or even shortly before, use, the CMP composition also can be produced by mixing the components of the CMP composition at or near a point-of-use. As used herein, the term "point-of-use" refers to the point at which the CMP composition is applied to a substrate surface (e.g., the polishing pad or the substrate surface itself). When the CMP composition is to be prepared by point-of-use mixing, the components of the CMP composition are separately stored in two or more storage devices.

To mix components contained in storage devices to produce a CMP composition at or near a point-of-use, the storage devices typically are provided with one or more flow lines leading from each storage device to the point-of-use of the CMP composition (e.g., the platen, the polishing pad, or the substrate surface). The term "flow line" refers a path of flow from an individual storage container to the point-of-use of the component stored therein. The one or more flow lines can each lead directly to the point-of-use, or, in the situation where more than one flow line is used, two or more of the flow lines can be combined at any point into a single flow line that leads to the point-of-use. Furthermore, any of the one or more flow lines (e.g., the individual flow lines or a combined flow line) can first lead to one or more of the other devices (e.g., pumping device, measuring device, mixing device, etc.) prior to reaching the point-of-use of the component(s).

Components of a CMP composition can be delivered to the point-of-use independently (e.g., the components are delivered to the substrate surface whereupon the components are mixed during the polishing process), or the components can be combined immediately before delivery to the point-of-use. Components are combined "immediately before delivery to the point-of-use" if they are combined less than 10 seconds prior to reaching the point-of-use, preferably less than 5 seconds prior to reaching the point-of-use, more preferably less than 1 second prior to reaching the point of use, or even simultaneous to the delivery of the components at the point-of-use (e.g., the components are combined at a dispenser at the point-of-use such as at a substrate or polishing pad). Components also are combined "immediately before delivery to the point-of-use" if they are combined within 5 meters of the point-of-use, such as within 1 meters of the point-of-use or even within 10 cm of the point-of-use (e.g., within 1 cm of the point of use).

When two or more components of a CMP composition are combined prior to reaching a point-of-use, the components can be combined in the flow line and delivered to the point-of-use without the use of a mixing device. Alternatively, one or more of the flow lines can lead into a mixing device to facilitate the combination of two or more of the components. Any suitable mixing device can be used. For example, the mixing device can be a nozzle or jet (e.g., a high pressure nozzle or jet) through which two or more of the components flow. Alternately, a mixing device can be a container-type mixing device that includes one or more inlets by which two or more components of the CMP composition are introduced to the container-type mixing device, and at least one outlet through which mixed components exit to be delivered to the point-of-use, either directly or via other elements of the apparatus (e.g., via one or more flow lines). A mixing device may include a single chamber or more than one chamber, each chamber having at least one inlet and at least one outlet, wherein two or more components are combined in each chamber. If a container-type mixing device is used, the mixing device preferably includes a mixing mechanism to uniformly agitate and combine the components, preferably without producing undue foam or air entrapment. Mixing mechanisms are generally known in the art and include stirrers, blenders, agitators, paddled baffles, gas sparger systems, vibrators, etc.

A CMP composition as described may be useful for polishing any suitable substrate, and can be particularly useful for polishing a substrate that includes a dielectric-containing (e.g., silicon oxide-containing) surface, especially one having a region of pattern dielectric that includes raised dielectric areas separated by trench areas of dielectric material. Exemplary substrates include those being processed for use as a component of a flat panel display, integrated circuit, memory or rigid disk, inter-layer dielectric (ILD) device, microelectromechanical system (MEMS), 3D NAND device, or the like, or any substrate that is undergoing a step of Shallow Trench Isolation (STI). The substrate may be a wafer of a size generally referred to in the CMP and semiconductor arts as a 200 millimeter wafer, a 300 millimeter wafer, or a larger wafer such as a 450 millimeter wafer.

For a substrate of any type, the substrate surface includes a continuous yet structured (non-planar, non-smooth) layer of dielectric material that has been placed over a lower layer that also includes surface structure or topography. This structured, non-planar region of the dielectric layer surface is referred to as "pattern dielectric." It results from dielectric material being placed over the uneven structure of the lower layer to fill trenches or holes present in the lower layer. To ensure complete filling of all trenches or holes, etc., and full coverage over the surface of the lower layer that contains the trenches or holes, etc., the dielectric material is deposited in an excess amount. The dielectric material will conform to the uneven topography of the lower layer, producing a deposited continuous dielectric surface characterized by raised areas that are separated by trenches. The raised areas will be the locations of active polishing and material removal, meaning the location from which most of the dielectric material is removed. The pattern dielectric material is also characterized by what is referred to as a "step height," which is the height of the dielectric material of the raised locations relative to the height of the dielectric material at the adjacent trenches.

The CMP composition is particularly well suited for planarizing or polishing a substrate that has undergone shallow trench isolation (STI) or a similar process, whereby dielectric is coated over a structured lower layer to produce regions of pattern dielectric material. For a substrate that has undergone shallow trench isolation, typical step heights can be in a range from 1,000 angstroms to 7,000 angstroms.

Described CMP compositions are also useful for planarizing or polishing a substrate that is an in-process 3D NAND flash memory device. In such substrates, a lower layer is made of semiconductor material that includes trenches, holes, or other structures that have a high aspect ratio, such as an aspect ratio of at least 10:1, 30:1, 60:1 or 80:1. When a surface having structures of such high aspect ratios is coated by dielectric material, the resultant pattern dielectric will exhibit a high step height, such as a step height that is substantially greater than 7,000 angstroms, e.g., greater than 10,000, 20,000, 30,000, or 40,000 angstroms, or more.

The dielectric layer of a substrate may comprise, consist essentially of, or consist of any suitable dielectric material, many of which are well known, including various forms of silicon oxide and silicon oxide-based dielectric materials. For example, a dielectric layer that includes silicon oxide or silicon oxide-based dielectric layer can comprise, consist of, or consist essentially of any one or more of: tetraethoxysilane (TEOS), high density plasma (HDP) oxide, phosphosilicate glass (PSG), borophosphosilicate glass (BPSG), high aspect ratio process (HARP) oxide, spin on dielectric (SOD) oxide, chemical vapor deposition (CVD) oxide, plasma-enhanced tetraethyl ortho silicate (PETEOS), thermal oxide, or undoped silicate glass (USG).

In the past, some examples of substrates that require planarization of pattern dielectric have been prepared to include a silicon nitride layer (e.g., a "silicon nitride cap" or "liner") at a location below active polishing regions of pattern dielectric material, e.g., a "cap" over a land surface of a structured semiconductor layer. The silicon nitride is designed to cause a stop to polishing and removal of dielectric material at the active region, upon reaching the silicon nitride layer. The silicon nitride layer functions to halt removal of material in a polishing step in a manner intended to reduce trench loss and dishing in final topography. This step, however, adds significant cost to a manufacturing process and still may not fully prevent dishing.

According to processes of the present description, a substrate may include a silicon nitride liner located at locations of intended ends of a dielectric polishing and removal step. In other embodiments, a substrate does not require and can optionally and preferably exclude a silicon nitride "liner" or "cap" disposed at locations of an end a step of removing dielectric from an active area.

According to these and other embodiments of substrates that may be processed by methods, using slurries, as described, a substrate may also include a silicon nitride layer, e.g., over a dielectric layer. When processing dielectric substrates having raised and lower (e.g., trench) features, a layer of silicon nitride may be placed over the raised and lowered dielectric material to protect the trench areas and improve planarization efficiency during CMP processing.

A substrate can be planarized or polished with the CMP composition described herein by any suitable technique, especially CMP processing using chemical-mechanical polishing (CMP) equipment. Typically, the CMP apparatus includes a platen, which, when in use, is in motion and has a velocity that results from orbital, linear, or circular motion; a polishing pad in contact with the platen and moving with the platen when in motion; and a carrier that holds a substrate to be polished by contacting and moving relative to the surface of the polishing pad. Polishing takes place by the substrate being placed in contact with a CMP composition as described, and typically a polishing pad, then removing at least a portion of the surface of the substrate, e.g., pattern dielectric material.

A substrate can be planarized or polished with the chemical-mechanical CMP composition in conjunction with any suitable polishing pad (e.g., polishing surface). Suitable polishing pads include, for example, woven and non-woven polishing pads. Moreover, suitable polishing pads can include any suitable polymer of varying density, hardness, thickness, compressibility, ability to rebound upon compression, and compression modulus. Suitable polymers include, for example, polyvinylchloride, polyvinylfluoride, nylon, fluorocarbon, polycarbonate, polyester, polyacrylate, polyether, polyethylene, polyamide, polyurethane, polystyrene, polypropylene, coformed products thereof, and mixtures thereof.

According to preferred methods, pattern dielectric is planarized and polished to reduce a step height between raised areas (having initial height h0) and trenches (having initial trench thickness t0). To accomplish this planarization effectively and efficiently, the process should include a high removal rate of raised areas of pattern dielectric material, along with a substantially lower removal rate of dielectric material of trenches. Preferably, the process also results in high planarization efficiency, optionally along with low trench loss and good self-stopping behavior.

During CMP polishing or planarization, dielectric material is removed from raised areas, and from trenches in smaller amounts. During polishing, the height of raised areas decreases to eventually be essentially level with the height of trenches. This can mean, for example, that step height is reduced to less than 1,000 angstroms, e.g., less than 900, 500, 300, or 250 angstroms. Reducing the height of raised areas removes the pattern of raised areas among the trenches, effectively removing the pattern and converting the pattern to a field of planarized dielectric, i.e., "blanket" dielectric or "blanket oxide," meaning a substantially planarized region of dielectric material.

Depending on the substrate being processed, an initial step height may be at least 1,000, 2,000, or 5,000 angstroms, and may be substantially greater, such as greater than 7,000 angstroms, or at least 10,000, 20,000, 30,000, or 40,000 angstroms, measured before beginning a step of CMP processing.

According to preferred processes of CMP planarization of substrates described herein, the pattern dielectric can be processed to a planarized surface by CMP processing of the pattern dielectric for a time that is less than 5 minutes, e.g., less than 3, 2, or 1 minute. This can be accomplished for a substrate with pattern dielectric that includes an initial step height of at least 7,000 or 10,000, e.g., 20,000, 30,000, or 40,000 angstroms. The surface is considered to be effectively planarized upon achieving a reduced (by polishing) step height (i.e., a "remaining" step height) of less than 1,000 angstroms, e.g., less than 900 angstroms, 500 angstroms, 300 angstroms, or 250 angstroms.

According to certain processes and slurries as described, the planarization efficiency of a process using a slurry that contains the alkylamine (alone or with cyclodextrin) can be improved relative to an otherwise identical slurry that does not contain the alkylamine; the alkylamine, either alone or in combination with cyclodextrin, can improve planarization efficiency. According to certain processes and slurries, planarization efficiency can be increased (due to the presence of the alkylamine) relative to a slurry that does not contain the alkylamine, while a removal rate of dielectric material can be not substantially reduced relative to a slurry that does not contain the alkylamine. While the presence of the alkylamine in the slurry, e.g., at a sufficiently high level, would cause a reduction in pattern dielectric removal rate, the presence of cyclodextrin (and complexation of the cyclodextrin with the alkylamine) allows the use of a lower amount of the alkylamine to achieve a desired improvement in planarization efficiency, or otherwise prevents the reduction in removal rate. Considered in a different way, when the alkylamine is complexed with the cyclodextrin and exhibits a reduced detrimental effect on removal rate, a greater amount of the alkylamine can be included to improve planarization efficiency. A trade-off can be made somewhere between removal rate and planarization efficiency, with the gain in planarization efficiency being large and the reduction in removal rate being very small when the alkylamine is complexed. At some point, the amount of alkylamine may reach a maximum, however, even with complexation, because a large amount of cyclodextrin required for the complexation may negatively affect the removal rate.

Both high active removal rate and good planarization efficiency are desired in a CMP slurry and CMP process, for processing a dielectric-containing substrate. Each is separately desirable, but an improvement in planarization efficiency is especially desirable if the improvement can be attained without substantially reducing the removal rate of pattern dielectric material.

According to certain processes using slurry as described, trench loss can be reduced and planarization efficiency can be improved relative to an otherwise identical slurry that does not contain the alkylamine. According to preferred processes and slurries, the amount of trench loss that will occur during polishing to planarization (defined, e.g., by a "remaining" step height of less than 1,000 angstroms, e.g., less than 900, 500, 300, or 250 angstroms), or for a given amount of processing time, can be decreased by the presence of the alkylamine in a slurry as described; i.e. trench loss for a process as described, using a slurry that contains the alkylamine compound, will be substantially less than (e.g., at least 10, percent less than) an amount of trench loss that would otherwise occur using the same process to process the same substrate with slurry that is similar but does not contain the alkylamine.

A lower trench loss will also be reflected in improved planarization efficiency, which refers to step height reduction (angstroms) divided by trench loss (angstroms) for a process. According to preferred processes of the present description, planarization efficiency can be improved by the presence of an alkylamine compound as described, i.e., planarization efficiency for a process as described, using a slurry as described that contains the alkylamine, will be substantially greater than (e.g., at least 10 percent greater than) a planarization efficiency that would occur using a similar process and slurry that is otherwise identical but does not containing the alkylamine, when processing a similar substrate and using identical process conditions and equipment. Desirable levels of planarization efficiency (step height reduction divided by trench loss) of a process as described can be at least 2.0, preferably at least 3.0, such as at least about 3.5. Alternately, planarization efficiency can be calculated as the value of: 1 minus the ratio of (amount of trench material removed)/(amount of active material removed). As a single example of a preferred process, a planarization efficiency of at least 0.7, e.g., at least 0.80, 0.85, or 0.87 can be achieved in a CMP process based on a 50 second polish on an STI dielectric pattern with a 5000Å incoming step height.

In these same processes, the removal rate of pattern dielectric can be not substantially reduced relative to an identical process using a slurry that is otherwise identical but does not contain alkylamine (or does not contain either alkylamine or cyclodextrin). Preferred alkylamine compounds can be included in the slurry (with cyclodextrin) in an amount that produces a desired improvement in planarization efficiency, while not also causing a substantial undesired reduction in the removal rate of pattern dielectric, e.g., in an amount that reduces the removal rate of pattern dielectric by less than 25, 15, 10, or 5 percent relative to an identical slurry that is otherwise identical but does not contain the alkylamine and cyclodextrin.

EXAMPLES

Methods and compositions as described, involving a ceria-based slurry containing the cyclodextrin-alkylamine complex, can be useful in CMP processing of patterned bulk silicon oxide material. Advantages of example slurries and processes are consistent with the needs of the 3D NAND industry, because the cyclodextrin-alkylamine complex maintains a very high pattern oxide removal rate when used as a composition additive, while simultaneously enhancing the planarization efficiency. In addition, slurries containing the complex and abrasive particles (e.g., ceria-based particles) can be useful or advantageous as an additive for PE enhancement for other processing applications as well, where bulk (e.g., silicon oxide) polishing is required, even if a slightly slower removal rate can be tolerated, because the PE enhancement from this complex can be significant, and better than alternative PE enhancing agents.

The present disclosure is based on the discovery that a cyclodextrin-alkylamine complex can be included in a CMP composition to provide improved planarization efficiency, with an acceptably low level of removal rate reduction, in bulk removal of pattern dielectric material. In example processes, the cyclodextrin-alkylamine complex functions to protect trench material of a patterned TEOS surface, enhancing PE during CMP with a ceria-based slurry. Without being bound by theory, the Coulombic attraction of the cationic alkylamine compound, along with hydrogen-bonding of the cyclodextrin, effectively build up and shield the trenches during the initial stages of CMP processing when pad asperities do not easily reach the trenches. This leads to formation of a protective layer that slows the erosion of the underlying silicon oxide in the trenches, thereby enhancing planarization efficiency. Experimental results show that an enhanced PE, as compared to a process using the same slurry without the complex, is maintained at both the 200-mm and 300-mm polishing platforms on both IC1010 (from Dow) and R200-01 (commercially available from Cabot Microelectronics) polishing pads.

Example 1

In example 1, the polishing "control slurry" is a ceria-based slurry as described in Applicant's co-pending patent application Ser. No. 14/639,564. The slurry (containing ceria particles and picolinic acid) is not believed to be previously known, commercially available, or described in any published patent application. The "control slurry" (including as presented in the "control slurry historical" curve- represented as the squares in FIG. 1) includes ceria particles (0.3%), picolinic acid (500ppm), and has a pH of about 4.0. The ceria particles of the control slurry were of an average particles size of 100 nanometers.

The polishing tool used was a Mirra; down force pressure was 3 pounds per square inch; slurry flow rate was 150 milliliters per minute. The pattern wafers included an initial step height of 2 microns and were made of TEOS ("pattern wafers"). Polishing times on the pattern wafers are indicated in the legend of the FIG. 1 in seconds.

Step height is the final measured step height after the timed polish. The original step height was 20,000 Å.

As shown at FIG. 1, the PE of the control slurry using a hard pad with no subpad (200 mm) is plotted alongside the same slurry with the addition of alkylamine (alone), or with addition of the cyclodextrin-alkylamine complex, to illustrate the enhancement of planarization efficiency with the alkylamine or with the complex. At ~5000 Å trench loss, the slurry with the complex has ~1000 Å lower step height remaining. Although the level of improvement is similar with and without the complexation with cyclodextrin in this example, the amount of alkylamine required in the slurry that uses the complex is 20% that of the slurry having alkylamine alone. Because the alkylamine can also reduce removal rate at higher levels, the complex is a better choice for maintaining removal rate while minimizing the amount of alkylamine required.

There is no significant rate reduction associated with addition of the cyclodextrin-alkylamine complex to the slurry.

The step heights were measured via HRP from the center of the trench to a distance on the raised feature 300 microns from the feature edge. The step height from that point near the edge of the feature to the center of the feature (a nonzero value due to feature rounding during CMP of very large 10-mm features) was measured optically with the F5x, and these values (the F5x feature rounding and the HRP step height) were added together to give the final plotted step height of the feature from the center of the trench to the center of the step.

Example 2

In example 2, the polishing "control slurry" is as described in Example 1. The Control 2 slurry is the D7295 slurry commercially available from Cabot Microelectronics. The Control 3 slurry is the D6720 slurry commercially available from Cabot Microelectronics. Control 2 and 3 slurries contained ceria and picolinic acid similar to the control slurry, but did not contain the cyclodextrin-alkylamine complex. The inventive slurry (denoted by square data points) is the control slurry plus the complex described herein.

The polishing tool used was a Mirra; down force pressure was 3 pounds per square inch; slurry flow rate was 150 milliliters per minute. The pattern wafers included an initial step height of 0.5 microns and were made of TEOS ("pattern wafers").

Figure 2:
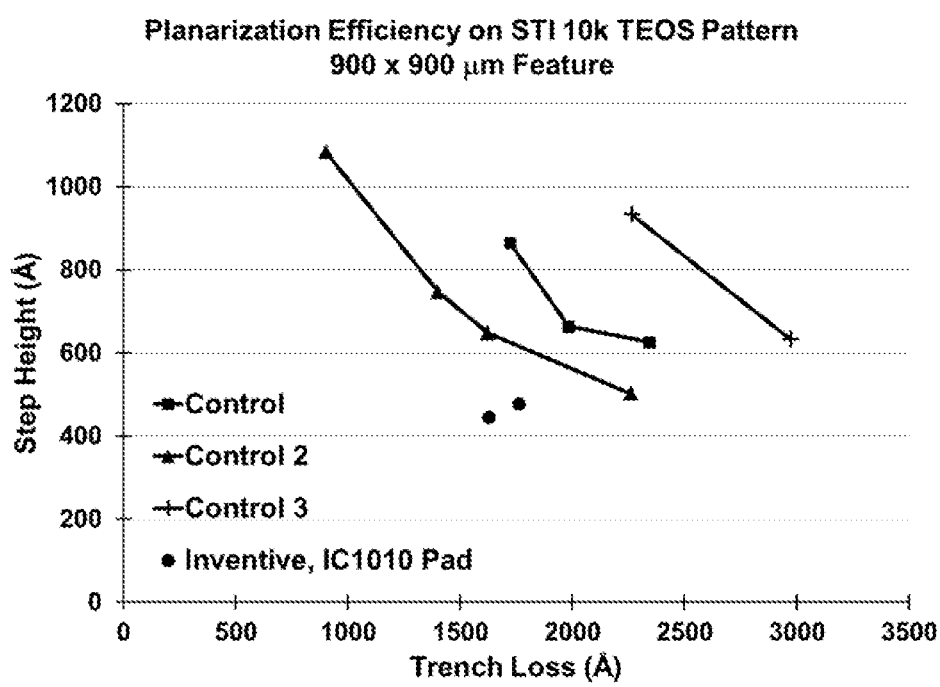

As shown at FIG. 2, the PE of the inventive slurry, containing the complex, using both an IC1010 pad and a IC1000 X,Y perforated pad is plotted alongside three slurries containing ceria particles and no complex. The results show an improvement in planarization efficiency with the inventive slurry that contained the complex.

The invention claimed is:

1. A chemical-mechanical planarization composition useful for processing dielectric material, the composition comprising:
   liquid carrier,
   cationically-charged abrasive particles dispersed in the liquid carrier,
   cyclodextrin selected from alpha-, beta-, gamma-cyclodextrin, or a combination thereof, and
   alkylamine compound comprising an amine group attached to an alkyl group capable of forming a complex with the cyclodextrin in the slurry, wherein the composition has a pH below 7 and the amine group exhibits a cationic charge in the slurry.

2. The composition of claim 1 wherein the alkylamine compound has a molecular weight below 1,000 grams per mole.

3. The composition of claim 1 wherein the alkyl group has from 5 to 50 carbon atoms.

4. The composition of claim 1 wherein the amine group has a pKa of at least 5.

5. The composition of claim 1 wherein the alkylamine compound is monocationic.

6. The composition of claim 1 wherein the alkylamine has the structure:

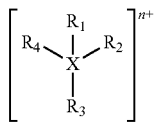

wherein:
   n is an integer,
   X is $N^+$,
   $R_1$ is an uncharged, straight or branched, saturated or unsaturated, alkyl group, containing from 5 to about 75 carbon atoms,
   $R_2$, $R_3$, and $R_4$ can independently be selected from:
      hydrogen,
      an aryl or cycloalkyl group that may be substituted or unsubstituted, that may optionally include a heteroatom, and that contains fewer than 12 carbon atoms, and
      a straight or branched, saturated or unsaturated alkyl group that may be substituted or unsubstituted, that may optionally include a heteroatom, and that contains fewer than 12 carbon atoms, and
      wherein two or three of $R_2$, $R_3$, and $R_4$, may form a saturated or unsaturated ring structure that may be substituted or unsubstituted, that may optionally include a heteroatom, the ring and optional substituent containing fewer than 12 carbon atoms.

7. The composition of claim 6 wherein
   $R_1$ is an uncharged, straight or branched, saturated or unsaturated, alkyl group, containing from 5 to about 40 carbon atoms, and
   each $R_2$, $R_3$, and $R_4$ is independently hydrogen or an alkyl having from 1 to 6 carbon atoms.

8. The composition of claim 6 wherein $R_1$ is an unbranched, saturated, uncharged alkyl group that contains from 5 to 40 carbon atoms.

9. The composition of claim 1 wherein the alkylamine is selected from: pentylamine, hexylamine, heptylamine, octylamine, nonylamine, decylamine, undecylamine, dodecylamine, N-lauroylsarcosine, and combinations thereof.

10. The composition of claim 1 comprising from about 0.001 to about 0.5 weight percent of the alkylamine based on total weight composition.

11. The composition of claim 1 comprising from about 0.01 to about 2 weight percent cyclodextrin based on total weight of the composition.

12. The composition of claim 1 comprising alkylamine-cyclodextrin complex of the cyclodextrin associated with the alkylamine compound.

13. The composition of claim 12 comprising from about 0.001 to about 2.5 weight percent of the alkylamine cyclodextrin complex.

14. The composition of claim 1 having a pH in a range from about 2 to about 5.

15. The composition of claim 1 wherein the abrasive particles are cationically charged ceria abrasive particles.

16. A method of polishing a dielectric-containing surface of a substrate, the method comprising:
   providing a substrate comprising a surface that includes dielectric material,
   providing a polishing pad,
   providing a chemical-mechanical polishing composition comprising: aqueous medium, abrasive particles dispersed in the aqueous medium, alkylamine having an amine group and an alkyl group having at least 5 carbon atoms, and cyclodextrin, the composition having a pH below 7, and the amine group in the slurry having a cationic charge,
   contacting the substrate with the polishing pad and the chemical-mechanical polishing composition; and
   moving the polishing pad and the chemical-mechanical polishing composition relative to the substrate to abrade at least a portion of the dielectric layer on a surface of the substrate to polish the substrate.

17. The method of claim 16 wherein the alkylamine has the structure:

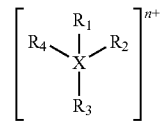

wherein:
   n is an integer,
   X is $N^+$,
   $R_1$ is an uncharged, straight or branched, saturated or unsaturated, alkyl group, containing from 5 to about 75 carbon atoms, $R_2$, $R_3$, and $R_4$ can independently be selected from:
hydrogen,
an aryl or cycloalkyl group that may be substituted or unsubstituted, that may optionally include a heteroatom, and that contains fewer than 12 carbon atoms, and
a straight or branched, saturated or unsaturated alkyl group that may be substituted or unsubstituted, that may optionally include a heteroatom, and that contains fewer than 12 carbon atoms, and
wherein two or three of $R_2$, $R_3$, and $R_4$, may form a saturated or unsaturated ring structure that may be substituted or unsubstituted, that may optionally include a heteroatom, the ring and optional substituent containing fewer than 12 carbon atoms.

* * * * *